US010229409B1

(12) United States Patent
Medina, III et al.

(10) Patent No.: US 10,229,409 B1
(45) Date of Patent: *Mar. 12, 2019

(54) ADVANCED SYSTEMS AND METHODS FOR GEOGRAPHICAL CARD

(71) Applicant: United Services Automobile Association (USAA), San Antonio, TX (US)

(72) Inventors: Reynaldo Medina, III, San Antonio, TX (US); Arthur Q. Smith, Fredericksburg, TX (US); John C. Hopkins, San Antonio, TX (US); Bradly J. Billman, San Antonio, TX (US); Teddy Voutour, Helotes, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 605 days.

This patent is subject to a terminal disclaimer.

(21) Appl. No.: 14/853,553

(22) Filed: Sep. 14, 2015

Related U.S. Application Data

(63) Continuation of application No. 12/500,888, filed on Jul. 10, 2009, now Pat. No. 9,135,611.

(51) Int. Cl.
G06Q 20/40 (2012.01)
G06Q 30/02 (2012.01)
G06Q 20/20 (2012.01)

(52) U.S. Cl.
CPC ............ G06Q 20/40 (2013.01); G06Q 20/20 (2013.01); G06Q 30/02 (2013.01)

(58) Field of Classification Search
None
See application file for complete search history.

(56) References Cited

U.S. PATENT DOCUMENTS

| 7,464,861 B2 | 12/2008 | Gindi |
| 2002/0010612 A1* | 1/2002 | Smith ............ G06Q 10/06375 705/7.35 |
| 2003/0236749 A1 | 12/2003 | Shergalis et al. |
| 2007/0055785 A1 | 3/2007 | Stevens |
| 2008/0035725 A1 | 2/2008 | Jambunathan et al. |
| 2008/0155006 A1* | 6/2008 | Franklin ................. H04L 67/34 709/200 |
| 2008/0162346 A1 | 7/2008 | Aaron et al. |
| 2008/0265018 A1 | 10/2008 | Kemper et al. |

(Continued)

OTHER PUBLICATIONS

Fawcett, Tom, et al., "Adaptive Fraud Detection," Data Mining and Knowledge Discovery 1, 1997, pp. 291-316, Kluwer Academic Publishers, The Netherlands.

Primary Examiner — Florian M Zeender
Assistant Examiner — Denisse Y Ortiz Roman
(74) Attorney, Agent, or Firm — Perkins Coie LLP

(57) ABSTRACT

A system, method, and computer-usable medium are disclosed for managing financial transactions by controlling the purchase of allowed and disallowed purchase items. A transaction control card is used to purchase a purchase item. Account information related to the transaction control card and purchase item data related to the purchase item is then processed to determine whether the purchase item is disallowed for purchase by any single, or combination of, disallowed purchase item data parameters.

20 Claims, 16 Drawing Sheets

(56) References Cited

U.S. PATENT DOCUMENTS

| | | |
|---|---|---|
| 2009/0012898 A1 | 1/2009 | Sharma et al. |
| 2009/0254476 A1* | 10/2009 | Sharma ................. G06O 20/10 705/39 |
| 2010/0088193 A1 | 4/2010 | White |

* cited by examiner

ADVANCED SYSTEMS AND METHODS FOR GEOGRAPHICAL CARD

CROSS-REFERENCE TO RELATED APPLICATIONS

This application is a continuation of U.S. patent application Ser. No. 12/500,888, filed on Jul. 10, 2009, issued as U.S. Pat. No. 9,135,611, which is hereby incorporated by reference for all purposes in its entirety.

TECHNICAL FIELD

Embodiments of the disclosure relate in general to the field of computers and similar technologies, and in particular to software utilized in this field. Still more particularly, it provides a system, method, and computer-usable medium for managing financial transactions by controlling the purchase of allowed and disallowed purchase items.

BACKGROUND

The use of credit, debit and purchase cards has become increasingly popular in recent years, due in part to their widespread acceptance by vendors and their ease of use. However, that very popularity has led to issues such as identity theft and other types of fraud. Another issue is their ease of use makes it easy for the user to lose track of the purchases they have made, and by extension, the amount of their available credit or bank balances, which can result in a deleterious effect on budget management. Yet another issue is the lack of controls over what the card can be used for, as well as where and when.

As an example, it is not uncommon for students to be provided a credit or debit card by their parents for making allowed purchases such food, fuel, school supplies, and other allowable expenses. However, the parent must rely on the student to not use the card for other purchases, such as clothing, entertainment, or perhaps other, less desirable purchases such as tobacco and alcoholic products. Furthermore, the parent must likewise rely on the student not to use the card outside of a predetermined geographical area, such as a neighborhood or a sector of a city. Yet another concern parents may have is that the student may attempt to use the card in a high crime area, thereby exposing themselves to danger. As another example, a company may issue a credit or purchase card to an employee to make approved purchases. Currently, administering and managing compliance to corporate purchase policies is typically after the fact, not before the employee attempts to make an unapproved purchase. As yet another example, consumers and businesspeople alike have difficulty adhering to a budget when using a card to make purchases, as it is difficult to determine in real-time how much they have already spent for a given budget category. Instead, they are often dismayed to discover they have overspent once they receive their statements.

Known approaches to some of these issues exist, including limiting the use of a credit or debit card to certain geographical areas or time of day. Other known approaches provide item-level purchase detail, but these approaches are generally used for after-the-fact accounting and reconciliation purposes. Yet other approaches disallow the use of a card for different classes of merchants. However, such controls are typically not granular enough to be effective. As an example, clothing and alcoholic beverages can be purchased at many grocery stores. Furthermore, no known approach provides multi-factor and granular purchase controls related to geographical location, time of day, merchant type, product type, or purchase amount. Moreover, no known approach combines such granular purchase controls with notification of an attempted purchase of a disallowed or unapproved purchase item.

SUMMARY

A system, method, and computer-usable medium are disclosed for managing financial transactions by controlling the purchase of allowed and disallowed purchase items. As used herein, a disallowed purchase item is a good or service that fails to meet the financial funds use restrictions associated with the transaction control card account. In various embodiments, disallowed purchase items are defined through the use of disallowed purchase item data parameters, such as an individual or type of purchase item, an individual or type of merchant, geographical location, or the time, frequency, type or maximum amount of a transaction. In these and other embodiments, the disallowed purchase item data parameters are used individually or in combination.

In various embodiments, a transaction control card is used to purchase a purchase item. Account information related to the transaction control card and purchase item data related to the purchase item is obtained and then processed to determine whether the purchase item is disallowed for purchase by any single, or combination of, disallowed purchase item data parameters. If so, then a request is generated and provided to the transaction control cardholder to authorize the purchase of the disallowed purchase item. The cardholder then modifies the disallowed purchase item data parameters associated with the disallowed purchase item to allow it to be processed as an allowed purchase item.

The budget category associated with the allowed purchase item is determined and a budget category expenditure amount is generated by processing purchase item amounts corresponding to other purchase items associated with the budget category. A budget category variance amount is then generated by processing a budget category allowance amount and the budget category expenditure amount corresponding to the budget category. In various embodiments, the budget category allowance amount, the budget category expenditure amount, and the budget category variance amount are provided to the transaction control cardholder. In these and other embodiments, the budget category information is displayed to the cardholder within a user interface of a computing device. Merchant information, transaction control card account information, and the allowed purchase item data is then processed to generate a purchase transaction. The purchase transaction is processed to generate a payment transaction for an amount corresponding to the allowed purchase items, which is then transmitted to the merchant's financial institution.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
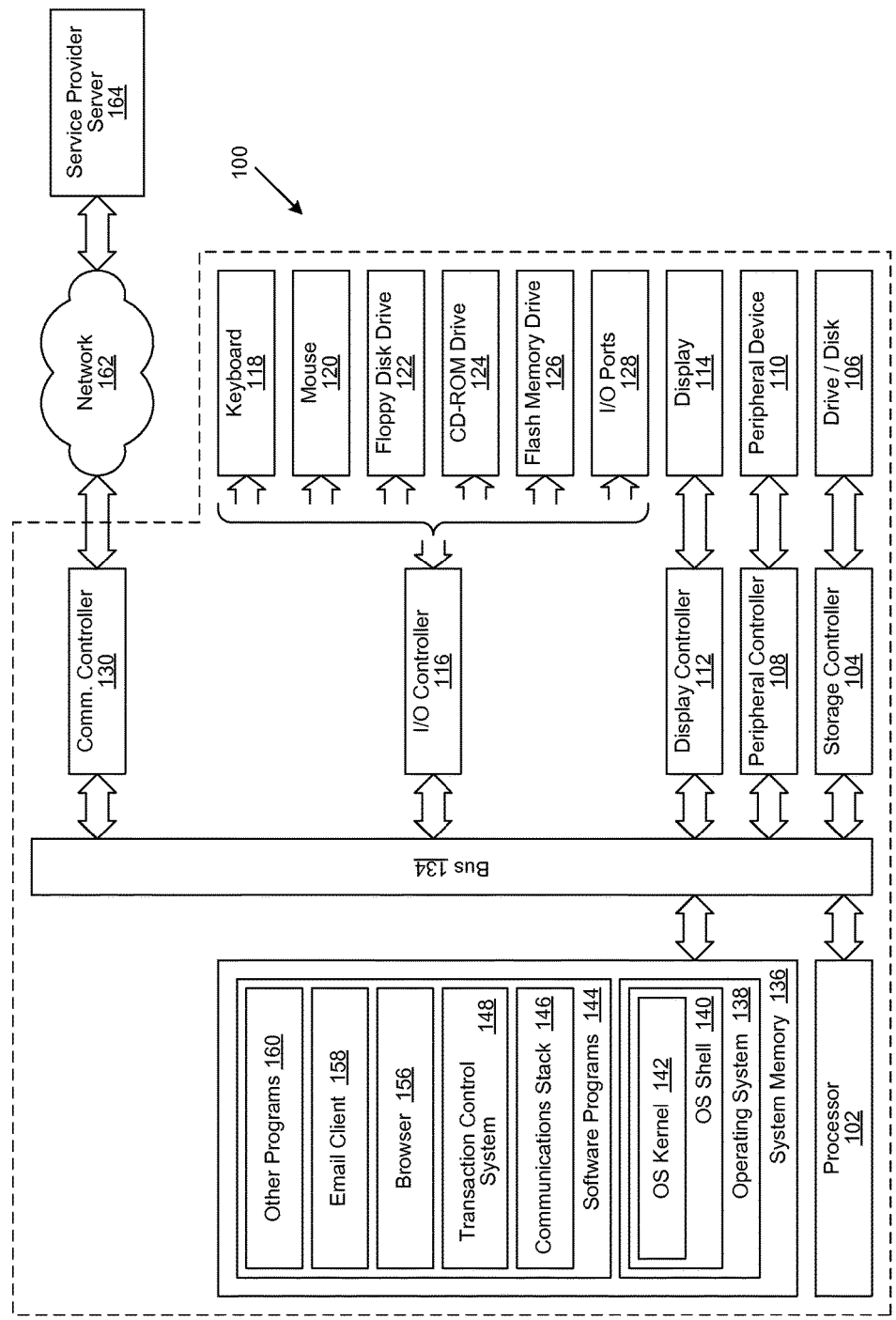
FIG. 1 depicts an exemplary client information processing system (IPS) in which embodiments of the disclosure may be implemented.

A method, system and computer-usable medium are disclosed for managing financial transactions by controlling the purchase of allowed and disallowed purchase items. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a transaction control system 148. The transaction control system 148 includes computer executable instructions for implementing the processes described in FIGS. 2-13 described hereinbelow. In one embodiment, client IPS 100 is able to download the computer executable instructions of the transaction control system 148 from a service provider server 164 located at a remote location. In another embodiment, the computer executable instructions of the transaction control system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
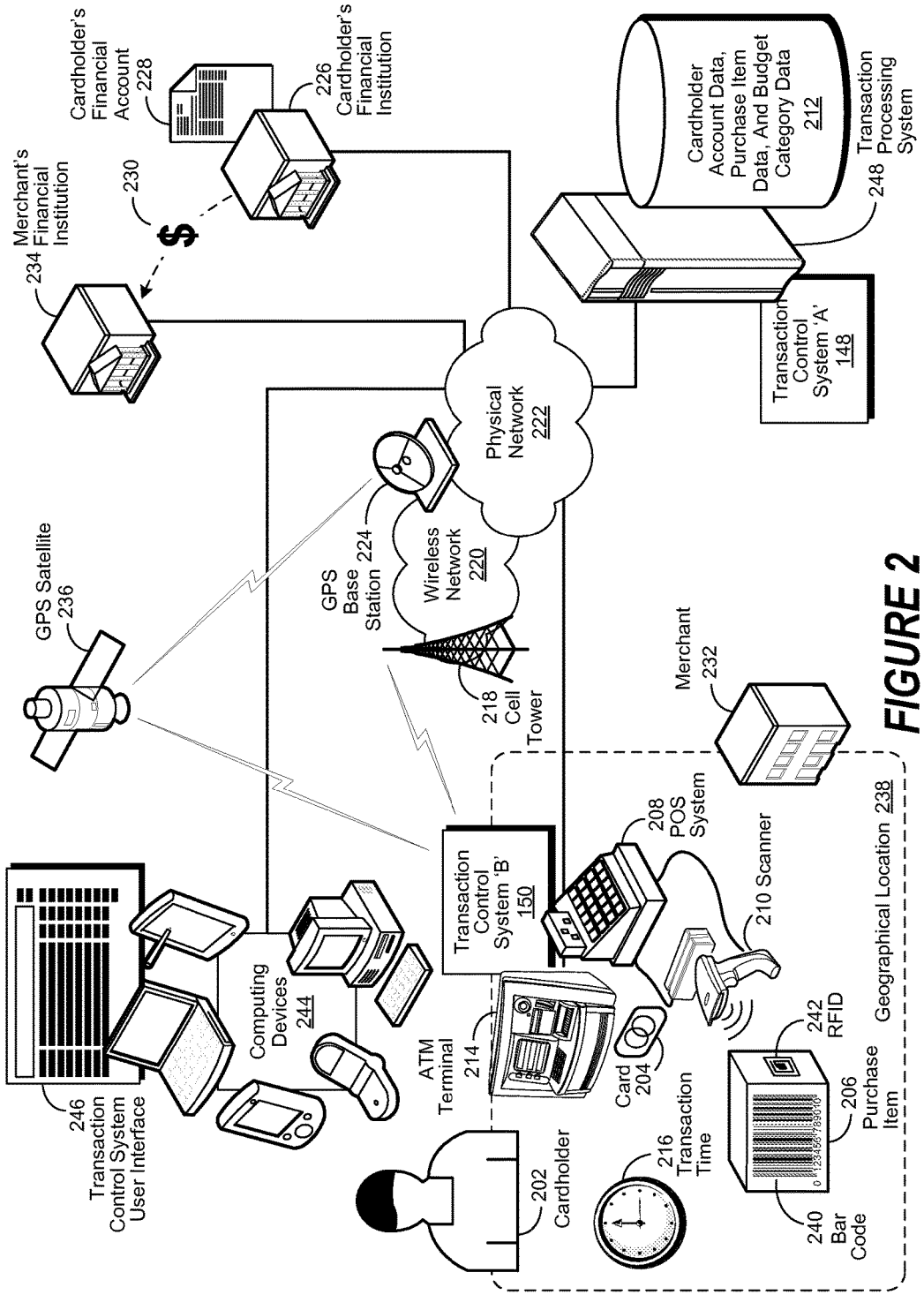
FIG. 2 is a simplified block diagram of a transaction control system as implemented in an embodiment of the disclosure for controlling the purchase of allowed and disallowed purchase items.

FIG. 2 is a simplified block diagram of a transaction control system as implemented in an embodiment of the disclosure for controlling the purchase of allowed and disallowed purchase items. As used herein, an allowed purchase item is a good or service that meets financial funds use restrictions associated with a transaction control card account. Conversely, a disallowed purchase item is a good or service that fails to meet the financial funds use restrictions associated with the transaction control card account. In various embodiments, the financial funds use restrictions are defined through the use of disallowed purchase item data parameters as described in greater detail herein. In these and other embodiments, the disallowed purchase item data parameters include, but are not limited to:

a particular purchase item 206
a purchase item type
a geographical location 238
a transaction time period 216
a maximum amount
a transaction type
a transaction frequency
a particular merchant 232
a merchant type.

In various embodiments, the disallowed purchase item data parameters are used individually or in combination. As an example, a time period parameter of 'NOT 10:00 PM to 6:00 AM' may disallow the use of the transaction control card for the purchase of any purchase item between 10:00 PM and 6:00 AM. As another example, a geographical location parameter of 'ONLY ZIP 78704' combined with a maximum amount parameter of '$25.00,' and a purchase item type parameter of 'Groceries' might restrict the use of the transaction control card for the purchase of no more than $25.00 for groceries within the 78704 ZIP code.

In various embodiments, the geographical location 238 of a point-of-sale (POS) system 208, or automated teller machine (ATM) terminal 214, associated with a merchant 232 is determined from the terminal's unique terminal identifier. In one embodiment, the unique terminal identifier comprises a media access control (MAC) address. In another embodiment, the unique terminal identifier comprises an international mobile equipment identity (IMEI). In yet another embodiment, the unique terminal identifier comprises a network address, such as an Internet Protocol (IP) or System Network Architecture (SNA) address.

In various embodiments, the unique terminal identifier is combined with location information to identify the terminal and its geographical location. In these and other embodiments, such location information is obtained from a global positioning system (GPS) system such as embodied in a GPS satellite 226 and a GPS base station 224 attached to a physical network 222 or wireless network 220. In another embodiment, information relating to a cell tower 218 is conveyed by the POS system 208 or automated teller machine (ATM) terminal 214 to the transaction control system 148. The transaction control system 148 can then process the GPS or cell tower location information to provide location data relating to the location of the POS system 208 or ATM terminal 214. It will be apparent to those of skill in the art that many such embodiments are possible and the foregoing are not intended to limit the spirit, scope, or intent of the disclosure.

In various embodiments, a transaction control system 'A' 148 is implemented with a transaction processing system 248 for the processing of purchase item transaction data. As used herein, purchase item transaction data refers to information related to an article of manufacture or a provided service that is received directly or indirectly by a user as a result of a purchase item transaction. As likewise used herein, a purchase item transaction refers to any action resulting in the exchange of value between parties. In various embodiments, the exchange of value may result in the transfer of monetary funds or other forms of value. In these and other embodiments, the transaction may likewise result in a change in the ownership status of an article of manufacture, a physical, intellectual, or financial asset, or the conveyance of a service.

In these and other embodiments, the transaction processing system 248 comprises a repository 212 of cardholder account data, purchase item data, and budget category data. As used herein, budget category data refers to information related to budgeting categories of financial expenditures or other forms of value. In various embodiments, the budget category data comprises a budget category identifier (ID), a budget category allowance amount, a budget category expenditure amount, and a budget category variance amount. As used herein, a budget category ID refers to a number, code, identifier, or other descriptor associated with a budget category. As an example, a purchase item such as a book may have a default budget category ID of 'Books' within the transaction control system 'A' 148 and 'B' 248. As another example, a purchase item such as a notebook may have a default budget category identifier of 'Office Supplies' within the transaction control 'A' 148 and 'B' 248.

As likewise used herein, a budget category allowance amount refers to a user-defined monetary amount, or other form of value, allocated to a budget category. In various embodiments, the budget category allowance is indexed to a corresponding budget category identifier within the repository 212 of cardholder account data, purchase item data, and budget category data. Likewise, as used herein, a budget category expenditure amount refers to the sum of the purchase item amounts corresponding to the purchase item IDs associated with a selected budget category ID. As used herein, a budget category variance amount refers to the difference between the budget category allowance amount and the budget category expenditure amount associated with a budget category ID.

Likewise, as used herein, purchase item data refers to information related to an article of manufacture, a physical, intellectual, or financial asset, or a provided service that is received directly or indirectly by a user 202. In various embodiments, the purchase item data comprises a purchase item identifier, which as used herein refers to a number, code, identifier, or other descriptor associated with an article of manufacture, a physical, intellectual, or financial asset, or a service provided by an intermediary, such as a retailer, a merchant, a distributor, or a broker. In various embodiments, the purchase item identifier comprises a Stock Keeping Unit (SKU) identifier or a manufacturer item identifier. As used herein, a manufacturer item identifier refers to a number, code, identifier, or other descriptor associated with an article of manufacture, a physical, intellectual, or financial asset, or a service by a manufacturer. In various embodiments, the manufacturer item identifier comprises a Universal Product Code (UPC). In various other embodiments, the manufacturer item identifier comprises a European Article Number (EAN) identifier. Skilled practitioners of the art will be aware that it is common for retailers, merchants, distributors, brokers, and other intermediaries to use a proprietary purchase item identifier, which is often cross-referenced to a unique manufacturer item identifier. Accordingly, it will be apparent that a single manufacturer item identifier may be cross-referenced to a plurality of purchase item identifiers. In one embodiment, the manufacturer item data comprises a single manufacturer item identifier that is cross-referenced to a plurality of purchase item identifiers.

In various embodiments, a transaction control system 'B' 150 is implemented with a POS system 208 or ATM terminal 214. In these various embodiments, the POS system 208 and ATM terminal 214 are operable to exchange information with the transaction processing system 250 over a connection with the physical network 222 or the wireless network 220. In these and other embodiments, the transaction control system 'A' 148 and the transaction control system 'B' 150 may operate independently or in concert with each other and the transaction processing system 248. In various embodiments, the POS system 208 comprises a scanner 210 that is used to receive purchase item data associated with a purchase item 206. In one embodiment, the purchase item data is contained in a bar code 240 familiar to those of skill in the art and the scanner 210 is a bar code scanner. In another embodiment, the purchase item data is contained within a radio frequency identifier (RFID) tag 242, likewise familiar to those of skill in the art, and the scanner 210 is an RFID scanner. In various embodiments, the purchase item data is received electronically, such as by a user selecting a menu item within the ATM terminal 214. In these and other embodiments, the purchase item data comprises financial account data and the allowed or disallowed purchase item comprises an amount of monetary funds.

In various embodiments, the purchase item data is contained in purchase item transaction data received from a POS system 208 operated by a retailer, merchant, distributor, broker, or other intermediary. In these and other embodiments, the purchase item transaction data comprises Level III data. Skilled practitioners of the art will be familiar with Level III data, which in addition to Level I and Level II data typically comprises a merchant identifier, a purchase amount excluding sales tax, a sales tax amount, a local tax indicator, a customer code, and line item detail information. Current Level III line item detail information also typically includes an item sequence number, an item commodity code, an item descriptor, an item product code, an item quantity, an item unit of measure, an item unit of cost, an item discount amount, a line item total, and a line item detail indicator. In various embodiments, Level III data comprises enhanced data related to a purchase item. In these and other embodiments, the enhanced data may comprise a discount amount, a freight or shipping amount, a duty amount, and an order date. In addition, the enhanced data may likewise comprise a tracking number, a receipt date, an origin and destination name and address, and an item service description.

Referring now to FIG. 2, a cardholder 202 presents a transaction control card 204 to purchase a purchase item 206. Account information related to the transaction control card 204 is received and processed by the POS system 208 or ATM terminal 214. As an example, the transaction control card account information is first read from the magnetic stripe on the back of the card by a card reader and then processed by the POS system 208 of a retailer or merchant 232. As another example, the transaction control card 204 may be read in a like manner by the ATM terminal 214 and then processed. Purchase item data related to the purchase item 206 is then obtained for processing as described in greater detail hereinabove. In one embodiment, the processing is performed by a local instance of the transaction control system 'B' 150 implemented within the POS system 208 or ATM terminal 214. In another embodiment, the processing is performed by a remote instance of the transaction control system 'A' 148 implemented with the transaction processing system 248. Once the processing is completed as described in greater detail hereinbelow, the results of the determination are then transmitted from the remote instance of the transaction control system 'A' 148 to the POS system 208 or the ATM terminal 214. In various embodiments, disallowed purchase item data is stored in a repository of cardholder account data, purchase item data, and budget category data 212. In these and other embodiments, subsets of disallowed purchase item data parameters associated with disallowed purchase items is indexed or otherwise cross-referenced to data associated with individual transaction control card account holders. As an example, a purchase item 206, such as a liquor or tobacco product, may be allowed for one transaction control card account holder 202, such as an adult, yet disallowed for another, such as a minor.

The purchase item data is then further processed to parse individual purchase item identifiers. A purchase item ID is selected and a determination is made in the repository of cardholder account data, purchase item data, and budget category data 212. If so, a determination is made whether the purchase item associated with the purchase item ID is disallowed. If not, then other purchase item data is used to determine whether the purchase item 206 associated with the purchase item ID is disallowed. If so, then the purchase item data is further processed to parse additional purchase item data elements for comparison to disallowed purchase item data parameters. Comparison operations are performed between the parsed purchase item data elements and their corresponding disallowed purchase item data parameters as described in greater detail herein.

A determination is then made whether purchase of the purchase item 206 is disallowed by any single, or combination of, disallowed purchase item data parameters. If so, then a request is generated for the transaction control cardholder 202, or its associated financial accountholder, to authorize the purchase of the disallowed purchase item 206. The purchase item data associated with the disallowed purchase item, as well as associated disallowed purchase item data parameters, is provided with the request to the transaction control cardholder or its associated financial accountholder. As an example, a transaction control cardholder 202 may wish to be notified of the attempted purchase of a disallowed purchase item 206, which may be a result of identity fraud. As another example, a parent, who is the accountholder of the financial account associated with the transaction control card 204, may wish to be notified of the attempted purchase of a disallowed purchase item 206 by a child who is the transaction control cardholder 202. A determination is then made by the transaction control cardholder 202 or the financial accountholder whether the disallowed purchase item 206 is to be processed as an allowed purchase item 206. If so, then the transaction control cardholder 202 or the financial accountholder modifies the disallowed purchase item data parameters associated with the disallowed purchase item 206 to allow it to be processed as an allowed purchase item 206. The purchase item data is processed as an allowed purchase item 206.

A determination is then made whether the purchase item ID associated with the allowed purchase item 206 is currently contained in a repository of cardholder account data, purchase item data, and budget category data 212. If not, then the transaction control cardholder 202 is requested to associate the purchase item ID of the allowed purchase item 206 with a budget category ID. Then, a budget category expenditure amount is generated by processing purchase item amounts corresponding to the purchase item IDs associated with the selected budget category ID. A budget category variance amount is then generated by processing the budget category allowance amount and the budget category expenditure amount corresponding to the selected budget category ID. In various embodiments, the budget category allowance amount, the budget category expenditure amount, and the budget category variance amount are provided to the transaction control cardholder 202. In these and other embodiments, the budget category information is displayed to the transaction control cardholder 202 within a user interface 246 of the transaction control system implemented on a computing device 244. In various embodiments, the computing devices 244 may comprise a personal computer, a laptop computer, or a tablet computer. The computing device 244 may also comprise a personal digital assistant (PDA), a mobile telephone, or any other suitable device operable to communicate with the transaction control system 'A' 148 or 'B' 150 over a connection to the physical network 222 or the wireless network 220. However, if the purchase item 206 is disallowed by the transaction control system 'A' 148 or 'B' 150, then the disallowed purchase item data corresponding to the disallowed purchase item 206 is displayed within an interface of the POS system 208 or the ATM terminal 214. In one embodiment, the purchase item data, along with its associated budget category identifier, allowance amount, expenditure amount, and variance amount are displayed within a first electronic mail message and the transaction control cardholder's 202 response is received within a second electronic mail message. In another embodiment, the purchase item data, along with its associated budget category identifier, allowance amount, expenditure amount, and variance amount are displayed within a first short message system (SMS) message and the transaction control cardholder's 202 response is received within a second SMS message.

Merchant 232 information (e.g., the merchant identifier, financial account number, etc.), transaction control card account information, and the allowed purchase item data is then processed to generate a purchase transaction comprising allowed purchase items 206. The purchase transaction is generated and then transmitted to the transaction control system 'A' 148, where it is received for processing. The received purchase transaction is then processed to extract the merchant information, the transaction control card account information, and the purchase item data. The transaction control card account information is processed to determine information related to its associated financial account 228. As an example, the financial account information may comprise financial institution information, such as a bank identification number (BIN), a routing transit number, or an account number for the financial account. The merchant information, transaction control card account information, financial account information, and the allowed purchase item data is then processed to generate and then transmit a payment request transaction to the financial institution 226 associated with the financial account 228.

The payment request transaction is received and then processed to extract the merchant information, the transaction control cardholder information, the financial account information, and allowed purchase item data. The extracted merchant information is processed to determine the financial institution 234 associated with the merchant 232. The payment request transaction is processed to generate a payment transaction for an amount 230 corresponding to the allowed purchase items, which is then transmitted to the financial institution 234 associated with the merchant 232.

Figure 3:
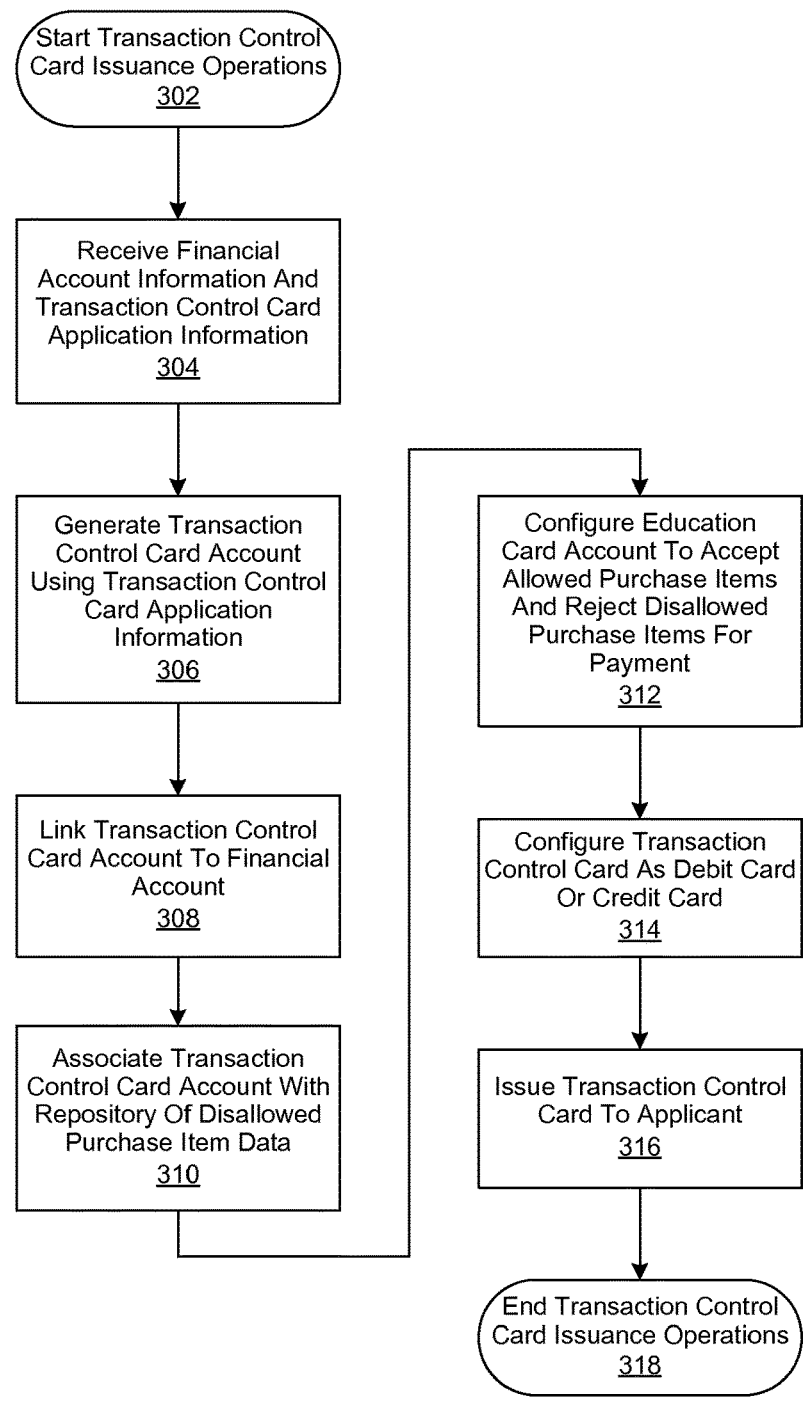
FIG. 3 is a generalized flowchart of the operation of a transaction control card system as implemented in an embodiment of the disclosure for the issuance of a transaction control card.
Figure 4A:
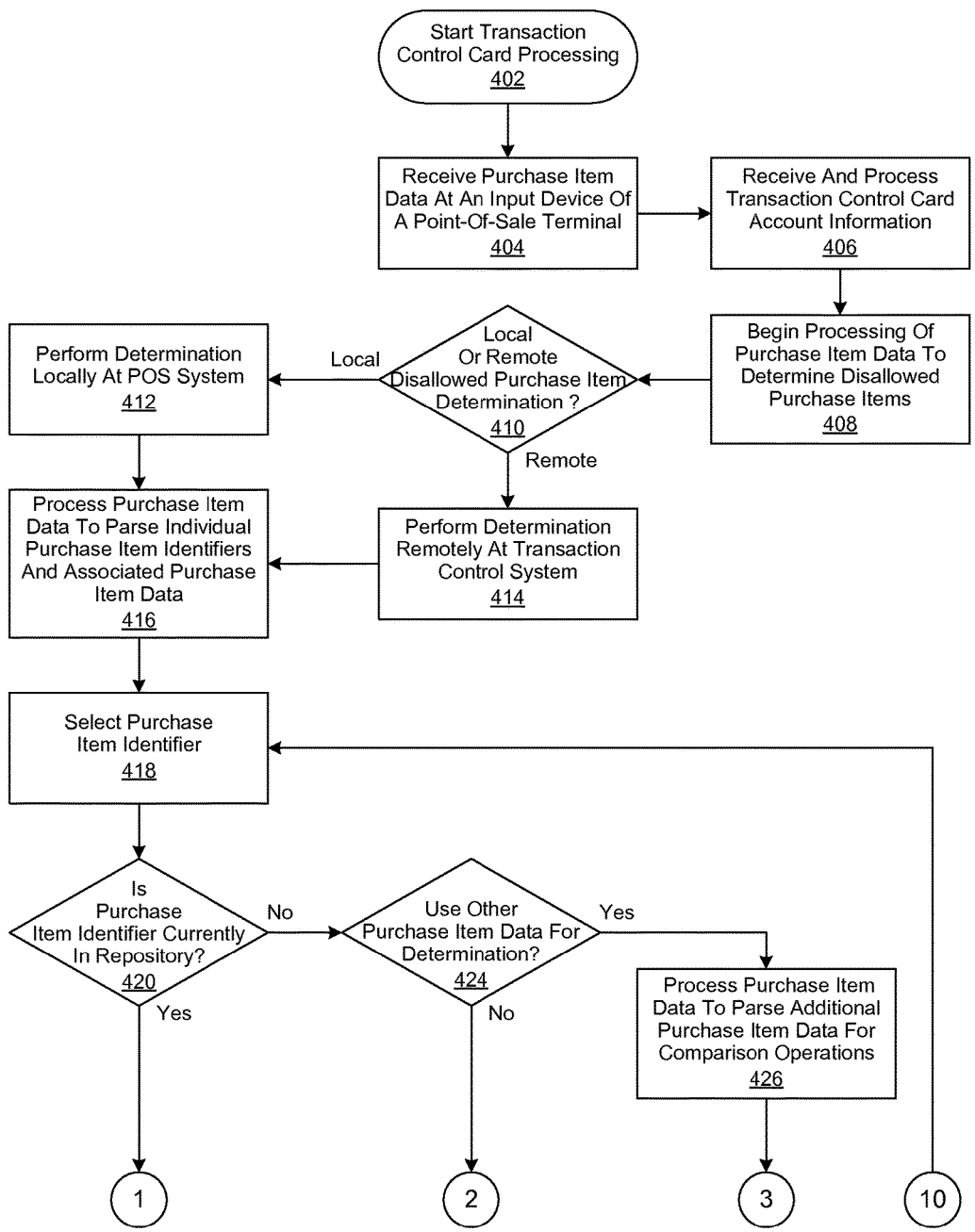
FIGS. 4a-e are a generalized flowchart of the operation of a transaction control card payment system as implemented in an embodiment of the disclosure for the processing of purchase and payment transactions related to a transaction control card account.
Figure 4B:
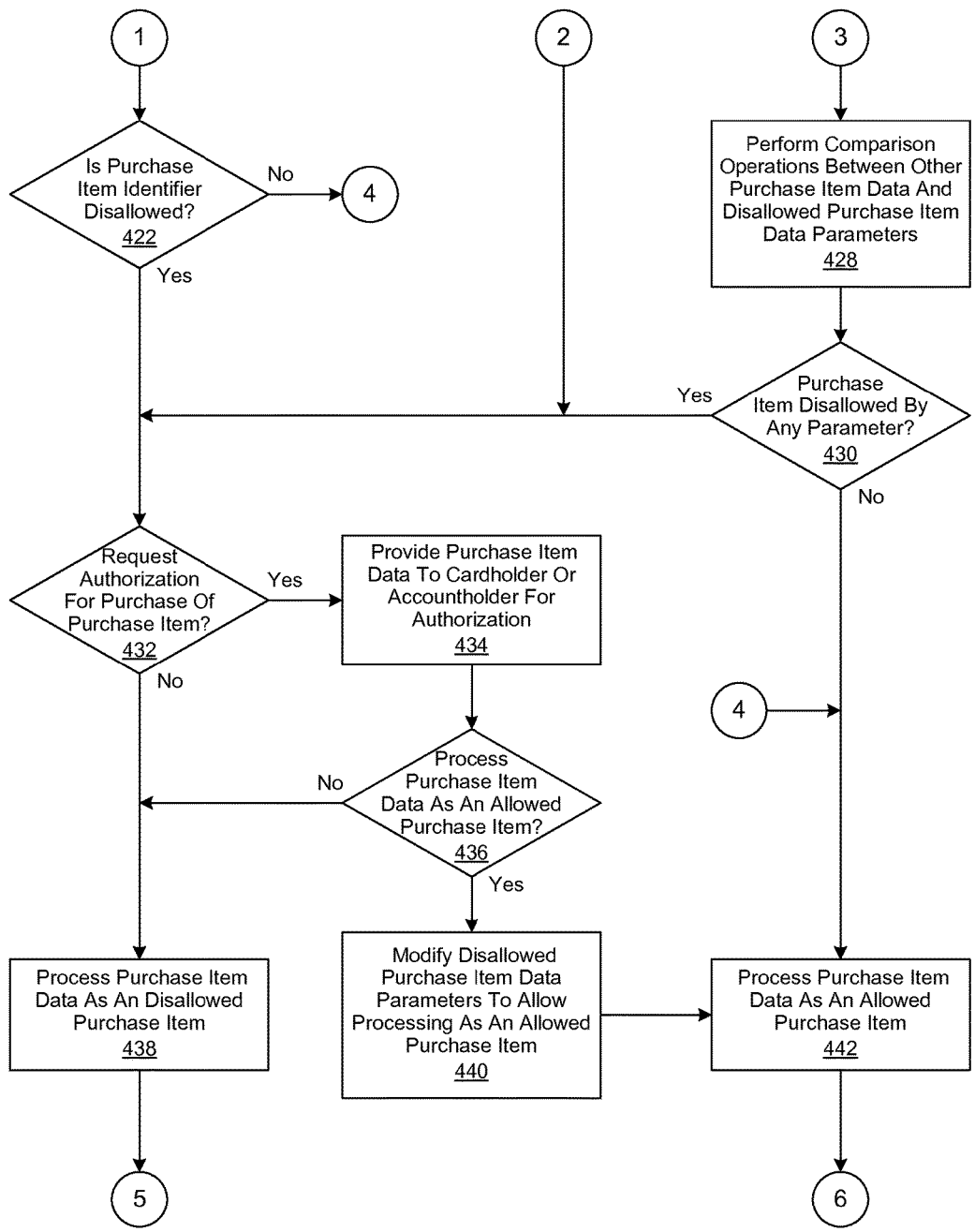
Figure 4C:
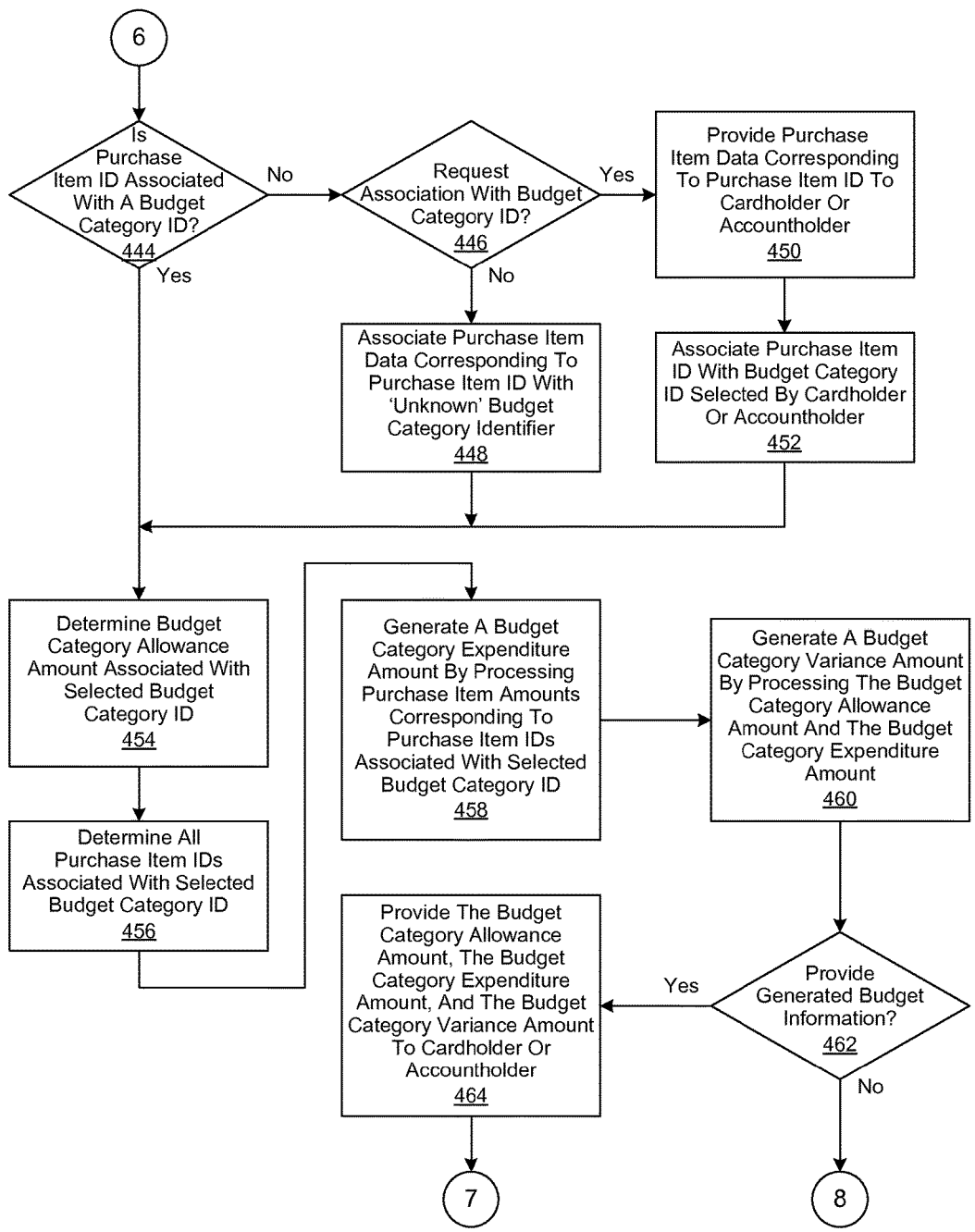
Figure 4D:
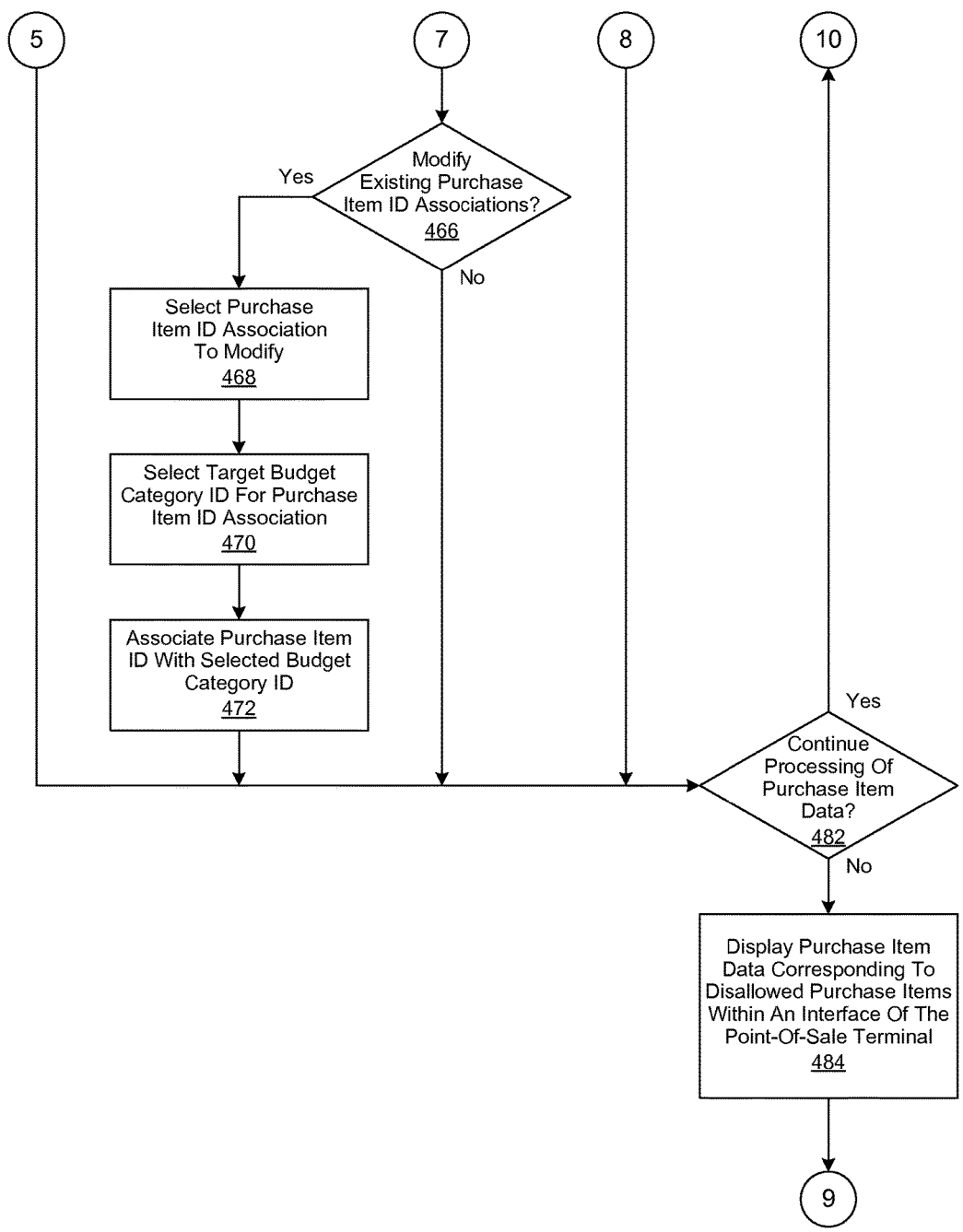
Figure 4E:
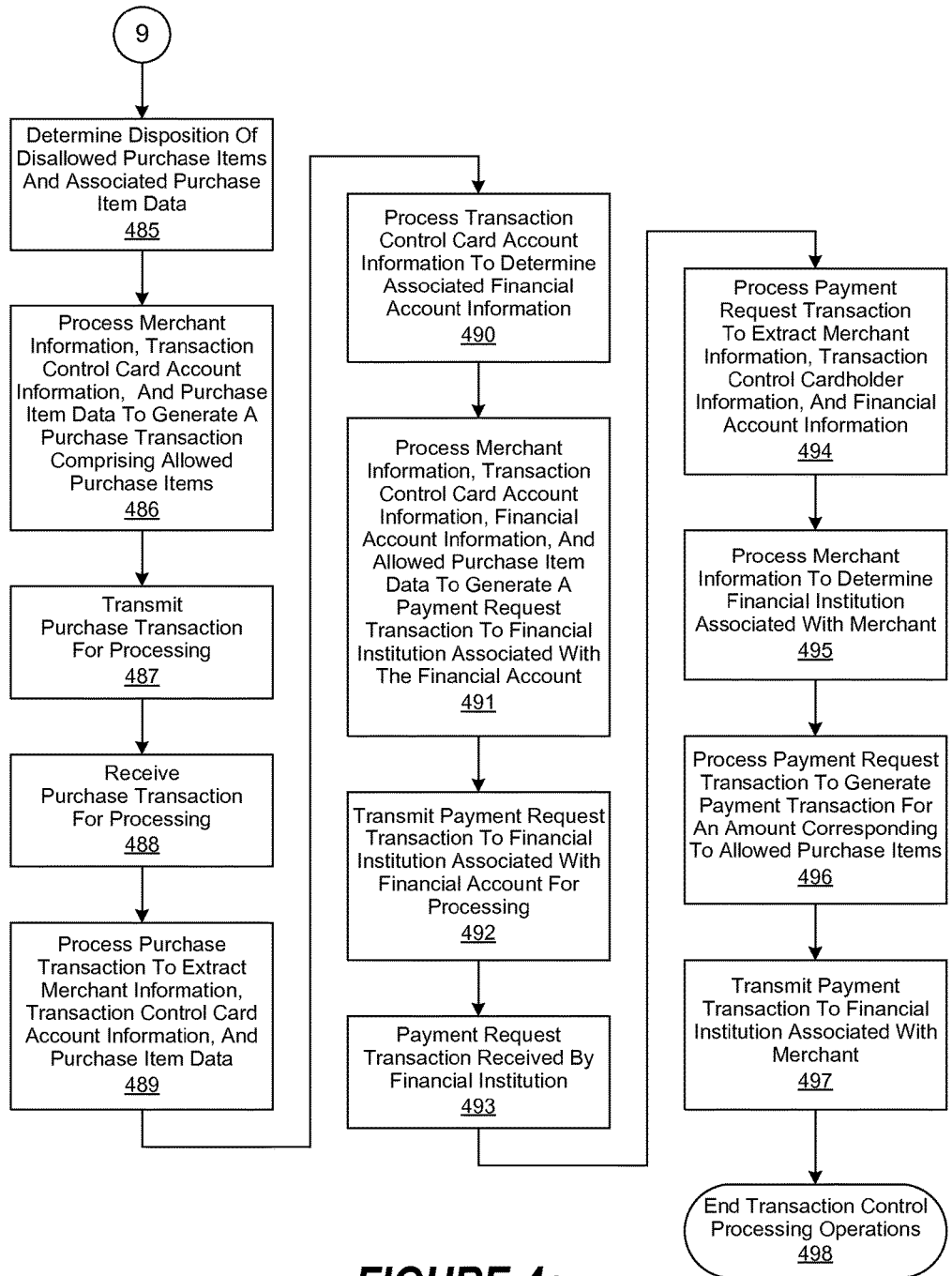

FIG. 3 is a generalized flowchart of the operation of a transaction control card system as implemented in an embodiment of the disclosure for the issuance of a transaction control card. In this embodiment, transaction control card issuance operations are begun in block 302, followed by receiving primary financial account information and transaction control card application information in block 304. In one embodiment, the primary financial account information and transaction control card application information is received by a transaction control card system. In various embodiments, the primary financial account information includes information relating to the financial institution that manages the primary financial account, such as its associated account number. In these and other embodiments, the primary financial account information likewise includes information related to the holder of the primary financial account, such as the account holder's personal, billing address, and other financial information.

In block 306, the provided transaction control card application information is used to generate a transaction control card account. The provided primary financial account information is then used in block 308 to link the transaction control card account to the primary financial account. As an example, the account number associated with the transaction control card account may be indexed, or otherwise cross-referenced, to the account number associated with the transaction control financial account. To further the example, a parent may wish to have a transaction control card account issued to a dependent, even though the parent, who is associated with the primary financial account, is financially responsible. To likewise further the example, a company may wish to have a transaction control card account issued to an employee, even though the company is financially responsible. Once linked, the transaction control card account is then associated in block 310 with a repository of cardholder account data, disallowed purchase item data, and budget category data. The transaction control card account is configured in block 312 to accept allowed purchase items and reject disallowed purchase items for payment and is then further configured in block 314 as a debit or credit card. The transaction control card is then issued to the transaction control card applicant in block 316 and transaction control card issuance operations are ended in block 318.

FIGS. 4a-e are a generalized flowchart of the operation of a transaction control card payment system as implemented in an embodiment of the disclosure for the processing of purchase and payment transactions related to a transaction control card account. In this embodiment, the processing of transactions generated by the use of a transaction control card is begun in block 402, followed by the receipt of purchase item data at an input device of a point-of-sale (POS) system in block 404. In various embodiments, the POS system is one such as commonly used by retailers and merchants. In various other embodiments, the POS system is an automated teller machine (ATM) terminal attached to an ATM network. It will be appreciated that many such POS systems are possible and the foregoing embodiments are not intended to limit the spirit, scope, or intent of the disclosure.

In one embodiment, the purchase item data is contained in a bar code familiar to those of skill in the art and the input device is a bar code scanner. In another embodiment, the purchase item data is contained within a radio frequency identifier (RFID) tag, likewise familiar to those of skill in the art, and the input device is an RFID scanner. In various embodiments, the purchase item data is received electronically, such as by a user selecting a menu item within a user interface of an ATM terminal. In these and other embodiments, the purchase item data comprises financial account data and the allowed or disallowed purchase item comprises an amount of monetary funds. In various embodiments, the purchase item data comprises Level III data. In these and other embodiments, the Level III data comprises enhanced data as described in greater detail herein.

In block 406, transaction control card account information is received and processed by the POS system. As an example, the transaction control card account information is first read from the magnetic stripe on the back of the card by a card reader and then processed by the POS system of a retailer or merchant. As another example, the transaction control card may be read in a like manner by the aforementioned ATM terminal and then processed. The processing of the purchase item data is then begun in block 408 to determine which of purchase items are disallowed for purchase by the transaction control card. A determination is then made in block 410 whether the processing is to be performed by a local or remote instance of the transaction control system. If it is determined in block 410 to perform the processing locally, then the processing is performed in block 412 by a local instance of the transaction control system implemented within the POS system. However, it is determined in block 410 to perform the processing remotely, then the purchase item data is transmitted by the POS system to a remote instance of the transaction control system, which in turn processes the purchase item data in block 414 to make the determination. Once the processing is completed as described in greater detail herein below, the results of the determination are then transmitted from the remote instance of the transaction control system to the POS system. In various embodiments, disallowed purchase item data is stored in a repository of cardholder account data, purchase item data, and budget category data. In these and other embodiments, subsets of disallowed purchase item data parameters associated with disallowed purchase items is indexed or otherwise cross-referenced to data associated with individual transaction control card account holders. As an example, a purchase item, such as a liquor or tobacco product, may be allowed for one transaction control card account holder, such as an adult, yet disallowed for another, such as a minor.

Once the results of the determination are completed in either block 412 or 414, the purchase item data is further processed in block 416 to parse individual purchase item identifiers, as described in greater detail herein, and their associated purchase item data. In various embodiments, the purchase item data may comprise a purchase item description, a purchase item amount, a number of purchase items received, a total purchase price of a plurality of purchase items, and a payment method. In these and other embodiments, the purchase item data may also comprise an identifier (ID) for the identification of a retailer, merchant, distributor, broker, or other intermediary. Likewise in these and other embodiments, the purchase item data may also comprise a product item ID, a manufacturer item ID, or both. In one embodiment, the purchase item data comprises a cross-referenced product ID and manufacturer item ID. In these and other embodiments, the product item ID comprises a stock keeping unit (SKU) identifier. In various embodiments, a manufacturer item ID is used as a purchase item ID. In these and other embodiments, the manufacturer item ID comprises a Uniform Product Code (UPC) identifier or a European Article Number (EAN) identifier. In various embodiments, the cross-referenced purchase item and manufacturer item identifiers are stored in a repository of cardholder account data, purchase item data, and budget category data.

A purchase item ID is selected in block 418. A determination is then made in block 420 whether the selected purchase item ID is currently contained in a repository of cardholder account data, purchase item data, and budget category data as described in greater detail herein. If so, then a determination is made in block 422 whether the purchase item associated with the purchase item ID is disallowed. Otherwise, a determination is made in block 424 whether to use other purchase item data to determine whether the purchase item associated with the purchase item ID is disallowed. If so, then the purchase item data is further processed in block 426 to parse additional purchase item data for comparison to disallowed purchase item data parameters. In block 428, comparison operations are performed between the parsed purchase item data and corresponding disallowed purchase item data parameters. In various embodiments, the disallowed purchase item data parameters include, but are not limited to:

a particular purchase item
a purchase item type
a geographical location
a time period
a maximum amount
a transaction type
a transaction frequency
a particular merchant
a merchant type.

In various embodiments, the disallowed purchase item data parameters are used individually or in combination. As an example, a time period parameter of 'NOT 10:00 PM to 6:00 AM' may disallow the use of the transaction control card for the purchase of any purchase item between 10:00 PM and 6:00 AM. As another example, a geographical location parameter of 'ONLY ZIP 78704' combined with a maximum amount parameter of '$25.00,' and a purchase item type parameter of 'Groceries' might restrict the use of the transaction control card for the purchase of no more than $25.00 for groceries within the 78704 ZIP code.

A determination is then made in block 430 whether purchase of the purchase item is disallowed by any single, or combination of, disallowed purchase item data parameters. If so, or if it was determined in block 424 to not use other purchase item data, or if it was determined in block 422 that the purchase item identifier was disallowed, then a determination is made in block 432 whether to request authorization for purchase of the disallowed purchase item. If so, then purchase item data associated with the disallowed purchase item, as well as associated disallowed purchase item data parameters, is provided to the transaction control cardholder or its associated financial accountholder for authorization in block 434. As an example, a transaction control cardholder may wish to be notified of the attempted purchase of a disallowed purchase item, which may be a result of identity fraud. As another example, a parent, who is the accountholder of the financial account associated with the transaction control card, may wish to be notified of the attempted purchase of a disallowed purchase item by a child who is the transaction control cardholder. Then, in block 436, a determination is made by the transaction control cardholder or the financial accountholder whether the disallowed purchase item is to be processed as an allowed purchase item. If so, then the transaction control cardholder or the financial accountholder modifies the disallowed purchase item data parameters associated with the disallowed purchase item in block 440 to allow it to be processed as an allowed purchase item. Then, or if it was determined in block 422 or block 430 that the purchase item was not disallowed, the purchase item data is processed as an allowed purchase item.

A determination is then made in block 444 whether the purchase item ID associated with the allowed purchase item is currently contained in a repository of cardholder account data, purchase item data, and budget category data. If not, then a determination is made in block 446 whether to request the transaction control cardholder or the financial accountholder to associate the purchase item ID of the allowed purchase item with a budget category ID. If not, then the purchase item data corresponding to the purchase item identifier is then associated with an "Unknown" budget category identifier in block 448. Otherwise, purchase item data corresponding to the allowed purchase item is provided to the transaction control cardholder or the financial accountholder in block 450, who then selects a budget category ID for association with the purchase item ID in block 452. Once the purchase item ID has been associated with a budget category ID in block 448 or 452, or if it was determined in block 444 that it was already associated with a budget category ID, then the budget category allowance amount associated with the budget category ID is determined in block 454. As used herein, a budget category allowance amount refers to a monetary amount, or other form of value, allocated to a budget category. In various embodiments, the budget category allowance is indexed to a corresponding budget category identifier within a repository of cardholder account data, purchase item data, and budget category data.

Then, in block 456, all purchase item IDs associated with the selected budget category ID are determined. A budget category expenditure amount is then generated in block 458 by processing purchase item amounts corresponding to the purchase item IDs associated with the selected budget category ID. A budget category variance amount is then generated in block 460 by processing the budget category allowance amount and the budget category expenditure amount corresponding to the selected budget category ID. A determination is then made in block 462 whether to provide the generated budget category information to the transaction control cardholder or the financial accountholder. If so, then the budget category allowance amount, the budget category expenditure amount, and the budget category variance amount are provided to the transaction control cardholder or the financial accountholder in block 464. In various embodiments, the budget category information is displayed to the transaction control cardholder or the financial accountholder within a user interface of the transaction control system implemented on a computing device.

A determination is then made in block 466 whether to modify existing purchase item ID and budget category ID associations. If so, then a purchase item ID association to modify is selected in block 468. A target budget category ID is then selected in block 470, and the purchase item ID is associated with the selected target budget category ID in block 472. However, if it was determined in block 432 to not request purchase authorization of a disallowed purchase item, or in block 436 to not process a disallowed purchase item as an allowed purchase item, then the purchase item is processed as a disallowed purchase item in block 438. Then, or after the association is completed in block 472, or if it was determined in block 466 to not modify the associations, or in block 462 to not provide the generated budget category information, then a determination is made in block 482 whether to continue processing of purchase item data. If so, then the process is continued, proceeding with block 418.

Otherwise, once the disallowed purchase item data corresponding to the disallowed purchase items is determined, it is displayed within an interface of the POS system in block 484. The disposition of the disallowed purchase items, and their corresponding purchase item data, is then determined in block 485. As an example, a student may attempt to purchase school supplies and a candy bar with his or her transaction control card. In this example, the purchase item data associated with the text book and the candy bar are processed and the school supplies are determined to be allowed and the candy bar to be disallowed. The student then may elect to either not purchase the candy bar, or to use another means of payment, such as cash funds, to purchase the candy bar. Then, in block 486, merchant information (e.g., the merchant identifier, financial account number, etc.), transaction control card account information, and the allowed purchase item data is processed to generate a purchase transaction comprising allowed purchase items.

Once the purchase transaction is generated in block 486, it is transmitted in block 487 to the transaction control system, where it is received in block 488 for processing. The received purchase transaction is then processed in block 489 to extract the merchant information, the transaction control card account information, and the purchase item data. The transaction control card account information is processed in block 490 to determine information related to its associated financial account. As an example, the financial account information may comprise financial institution information, such as a bank identification number (BIN), a routing transit number, or an account number for the financial account. The merchant information, transaction control card account information, financial account information, and the allowed purchase item data is then processed in block 491 to generate a payment request transaction to the financial institution associated with the financial account. Once the payment request transaction is generated in block 491, it is then transmitted in block 492 to the financial institution associated with the financial account, where it is received in block 493 for processing.

The payment request transaction is then processed in block 494 to extract the merchant information, the transaction control cardholder information, the financial account information, and allowed purchase item data. In block 495, the extracted merchant information is processed to determine the financial institution associated with the merchant. The payment request transaction is processed in block 496 to generate a payment transaction for an amount corresponding to the allowed purchase items. The payment transaction is then transmitted to the financial institution associated with the merchant in block 497 and the processing of transaction control card transactions is then ended in block 498.

Figure 5:
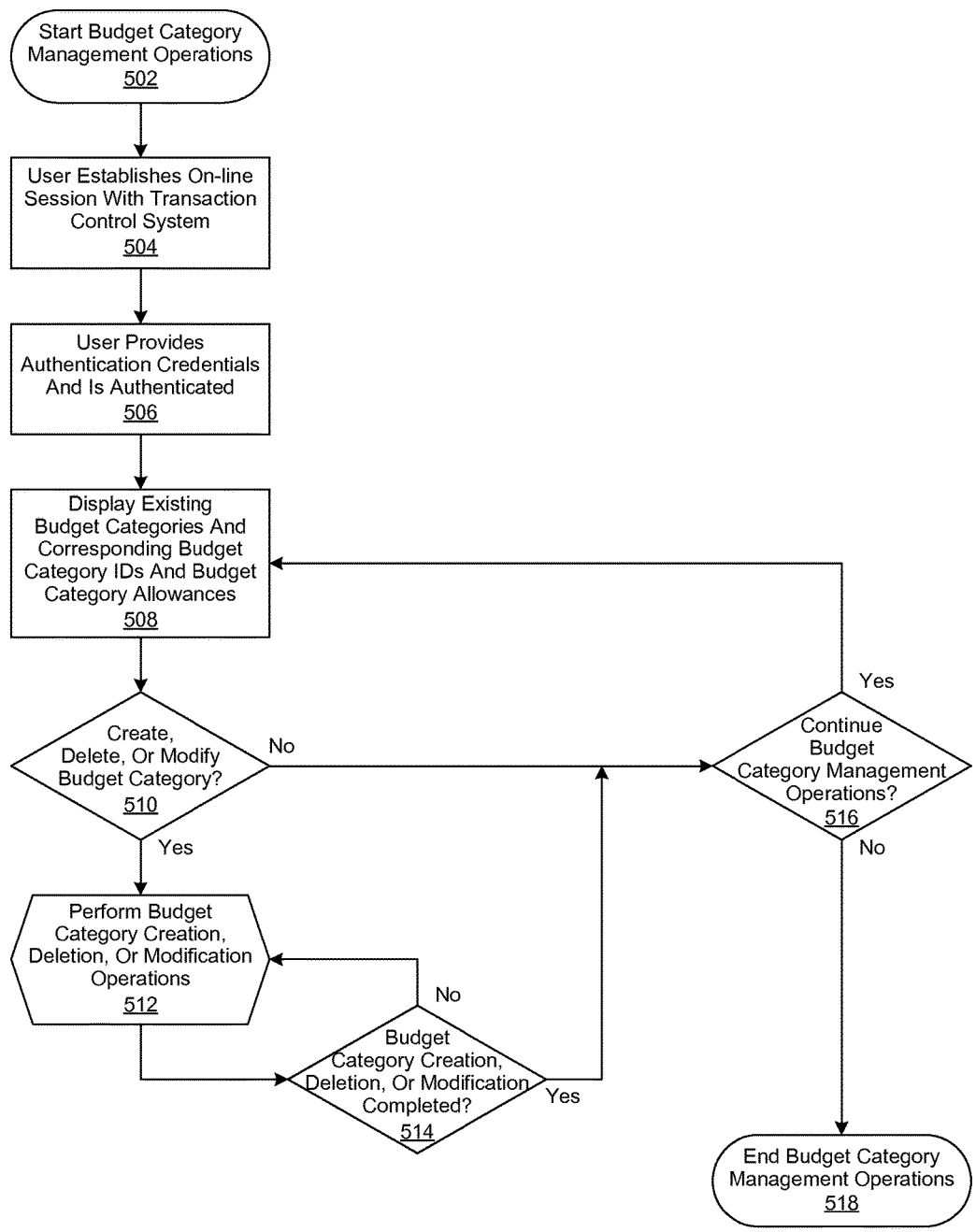
FIG. 5 is a generalized flowchart of the operation of a transaction control system as implemented in an embodiment of the disclosure for the management of budget categories.

FIG. 5 is a generalized flowchart of the operation of a transaction control system as implemented in an embodiment of the disclosure for the management of budget categories. In this embodiment, budget category management operations are begun in block 502, followed by followed by a user establishing an on-line session with the transaction control system in block 504. In block 506, the user provides authentication credentials and is authenticated, followed by the display of existing budget categories, along with their corresponding budget category identifiers and budget category allowance amounts in block 508.

A determination is then made in block 510 whether a budget category is to be created, deleted, or modified. If not, then a determination is made in block 516 whether to continue budget category management operations. If so, then the process is continued, proceeding with block 508. Otherwise, budget category management operations are ended in block 518. However, if it is determined in block 510 to create, delete, or modify a budget category, then budget category creation, deletion, or modification operations are performed in block 512. A determination is then made in block 514 whether budget category creation, deletion, or modification operations are completed. If not, then the process is continued, proceeding with block 512. Otherwise, the process is continued, proceeding with block 516 as described hereinabove.

Figure 6:
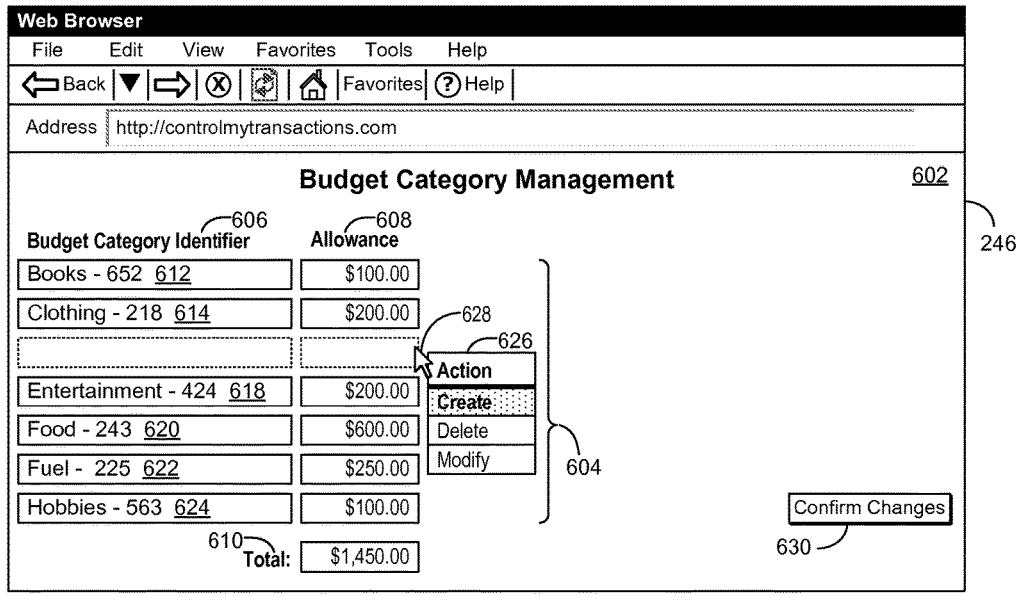
FIG. 6 is a simplified illustration of a budget management system as implemented within a window of a user interface in accordance with an embodiment of the disclosure for the management of budget categories.

FIG. 6 is a simplified illustration of a budget management system as implemented within a window of a user interface in accordance with an embodiment of the disclosure for the management of budget categories. In this embodiment, a user interface (UI) 246 of a transaction control system comprises a "Budget Category Management" window 602. The "Budget Category Management" window 602 comprises data fields for a plurality of budget categories 604, each of which comprises a budget category identifier 606 and a budget category allowance amount 608. The 'Budget Category Management' window 602 further comprises a 'Total' 610 display field with a value of '$2,975.09' and a 'Confirm Changes' 630 command button. As illustrated in FIG. 6, the plurality of budget categories 604 comprises budget category identifiers for 'Books—652' 612, 'Clothing—218' 614, 'Entertainment—424' 618, 'Food—243' 620, 'Fuel—225' 622, and 'Hobbies—563' 624. Each of these has a corresponding 'Budget Allowance Amount' 608 as described in greater detail herein. In various embodiments, operations are performed by a user within the 'Budget Category Management' window 602 for the creation, deletion, and modification of budget categories. As illustrated in FIG. 6, the user has elected to create a new budget category through the use of a user gesture, such as a right-mouse-click with cursor 628, which results in the display of 'Action' drop-down menu 626.

Figure 7:
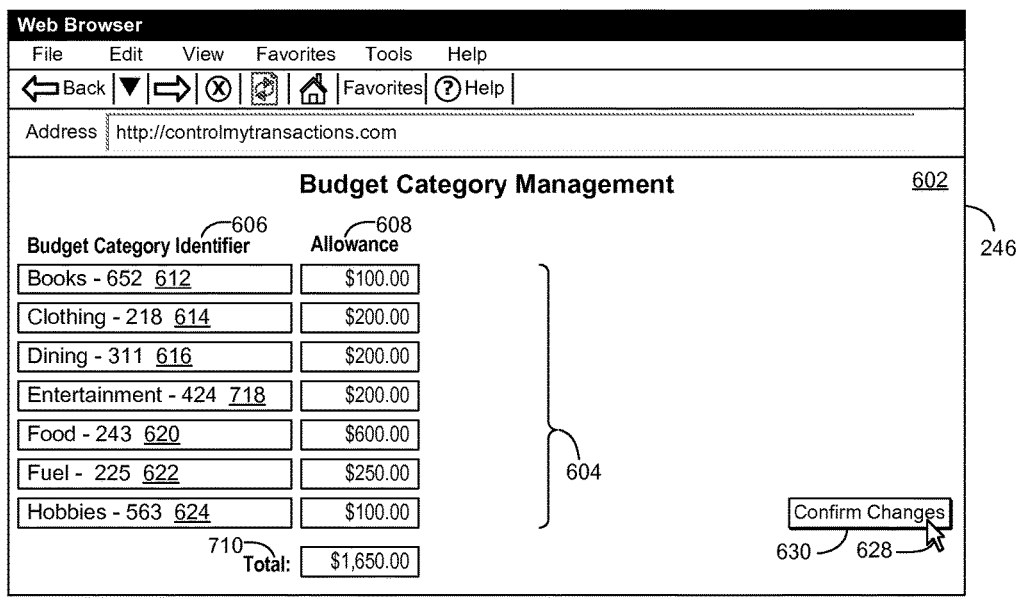
FIG. 7 is a simplified illustration of a budget management system as implemented within a window of a user interface in accordance with an embodiment of the disclosure for the creation of a budget category.

FIG. 7 is a simplified illustration of a budget management system as implemented within a window of a user interface in accordance with an embodiment of the disclosure for the creation of a budget category. Referring now to FIG. 7, a new budget category has been created as a result of the budget category creation operation illustrated in FIG. 6. Likewise, the user has associated the new budget category with a budget category identifier 606 of 'Dining—616' 718 and has also given it a budget category allowance amount 608 value of '$300.00'. As a result, the 'Total' 710 display field has been updated to reflect a total 'Budget Allowance Amount' 608 value of '$1,650.00.' Once all budget category creation, deletion, and modification operations are completed, they are confirmed though a user gesture, such as a left-mouse-click with cursor 628 on the 'Confirm Changes' 630 command button.

Figure 8A:
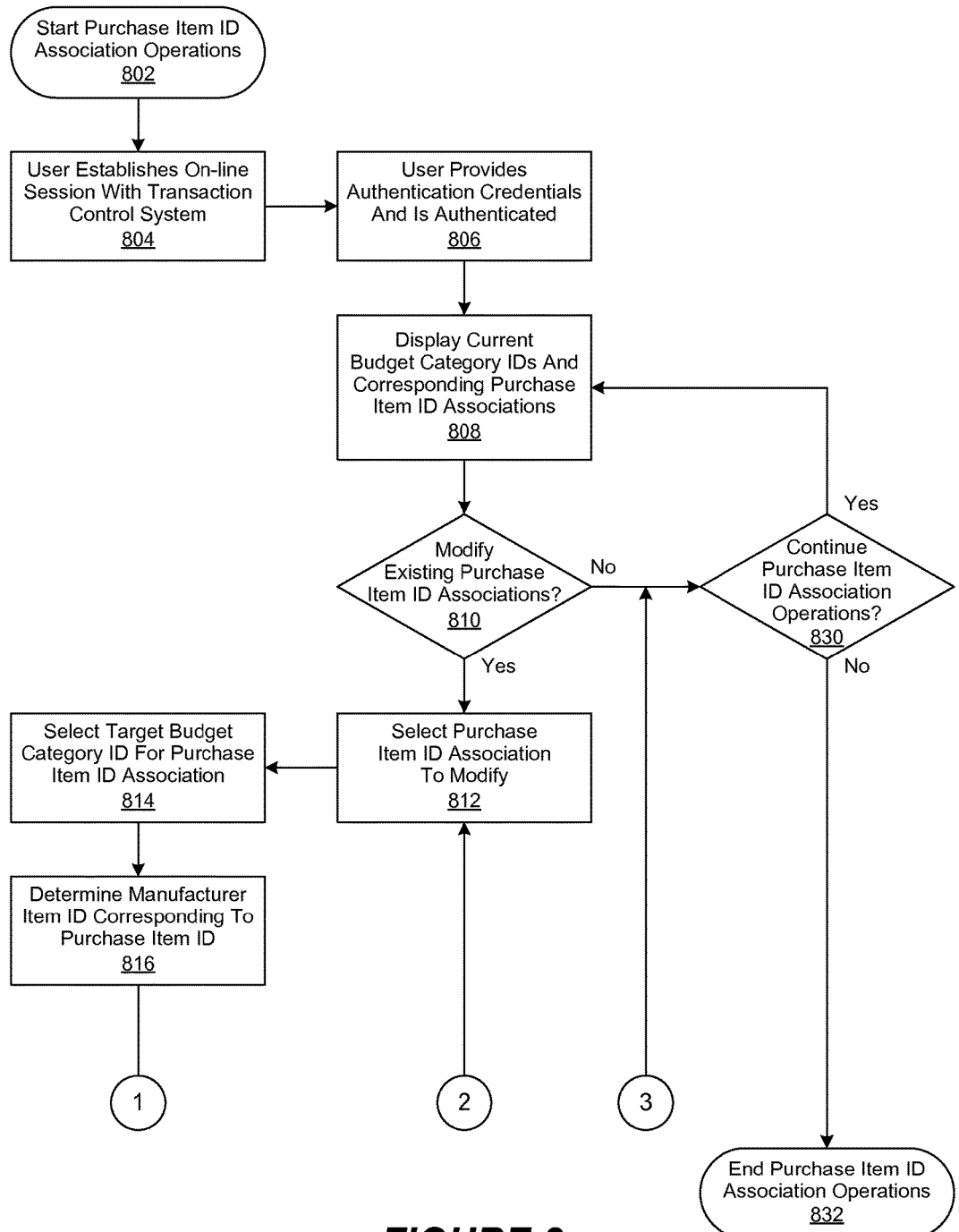
FIGS. 8a-b are a generalized flowchart of the operation of a transaction control system as implemented in an embodiment of the disclosure for the management of purchase item identifier associations.
Figure 8B:
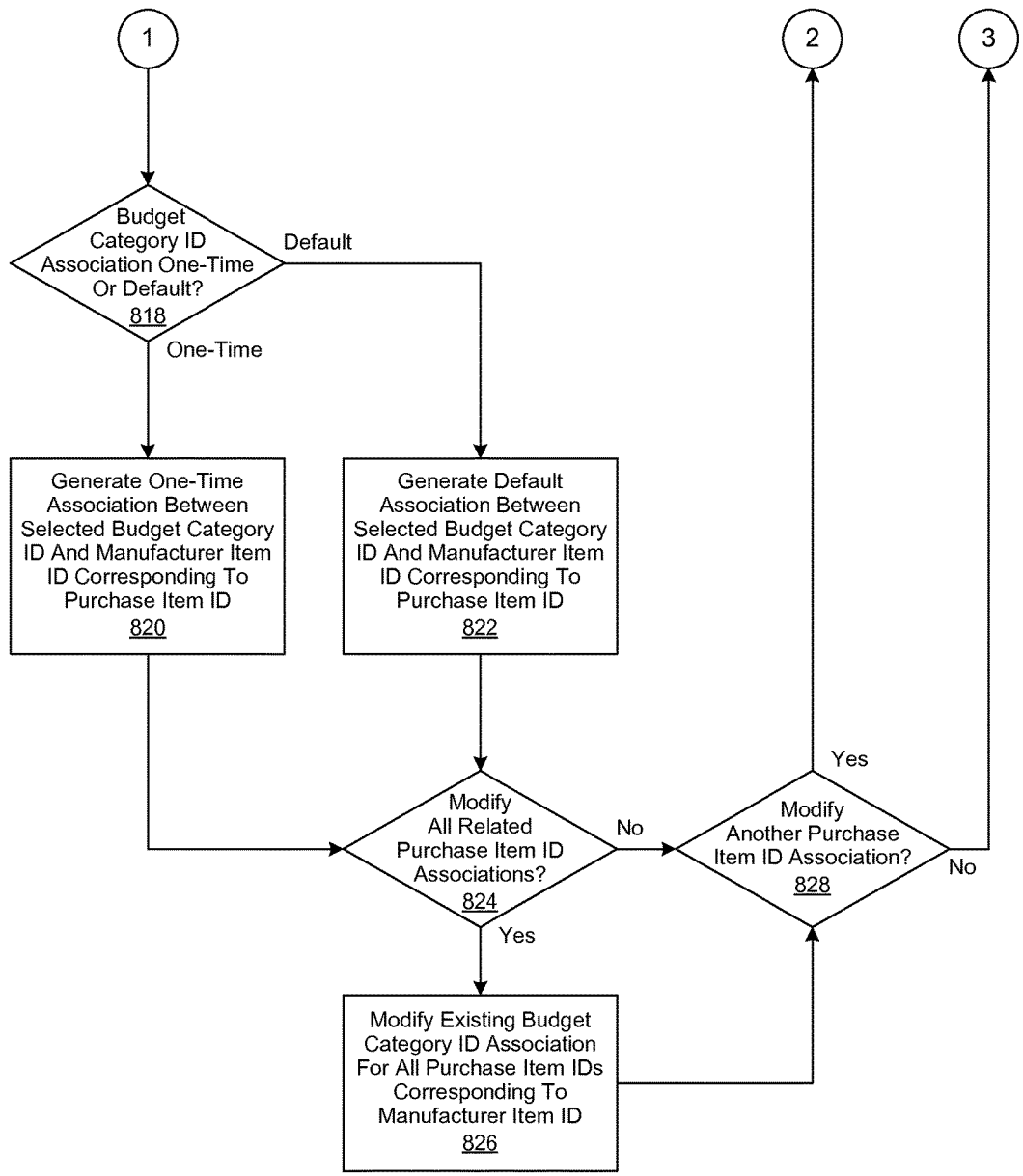

FIGS. 8*a-b* are a generalized flowchart of the operation of a transaction control system as implemented in an embodiment of the disclosure for the management of purchase item identifier associations. In this embodiment, purchase item identifier (ID) association operations are begun in block 802, followed by followed by a user establishing an on-line session with the transaction control system in block 804. In block 806, the user provides authentication credentials and is authenticated, followed by the display in block 808 of existing budget category IDs and their corresponding purchase item ID association. In various embodiments, the associations are displayed within a user interface of the transaction control system implemented on a computing device. A determination is then made in block 810 whether to modify existing purchase item ID and budget category ID associations. If not, then a determination is made in block 830 whether to continue purchase item ID and budget category ID association operations. If so, then the process is continued, proceeding with block 808. Otherwise, purchase item ID and budget category ID association operations are ended in block 832.

However, if it is determined in block 810 to modify existing purchase item ID and budget category ID associations, then a purchase item ID association is selected in block 812. A target budget category ID is then selected in block 814, followed by the determination in block 816 of the manufacturer item ID that corresponds to the purchase item ID. In various embodiments, and as described in greater detail herein, a manufacturer item ID is associated with a budget category ID. In turn, the manufacturer item ID may be associated with one or more purchase item IDs. In these and other embodiments, the manufacturer item ID acts as an index between a purchase item ID and a corresponding budget category ID. A determination is then made in block 818 whether modifying the association between the budget category ID and purchase item ID will be performed one time or whether modifying the association will result in a default association going forward. If it is determined in block 818 that the association is to be modified one time, then a one-time association is generated in block 820 between the selected budget category ID and the manufacturer item ID corresponding to the purchase item ID. Otherwise, a default association is generated in block 822 between the selected budget category ID and the manufacturer item ID corresponding to the purchase item ID. Once the modification to the association between the selected budget category ID and the manufacturer item ID corresponding to the purchase item ID in steps 820 or 822, a determination is made in block 824 whether to modify all existing budget category ID associations with purchase item IDs associated with the manufacturer item ID. If so, then all such existing budget category ID associations are modified in block 826. Otherwise, or once all such existing budget category ID associations are modified in block 826, a determination is made in block 828 whether to modify another purchase item ID association. If so, then the process is continued, proceeding with block 812. Otherwise, the process is continued, proceeding with block 830 as described hereinabove.

Figure 9:
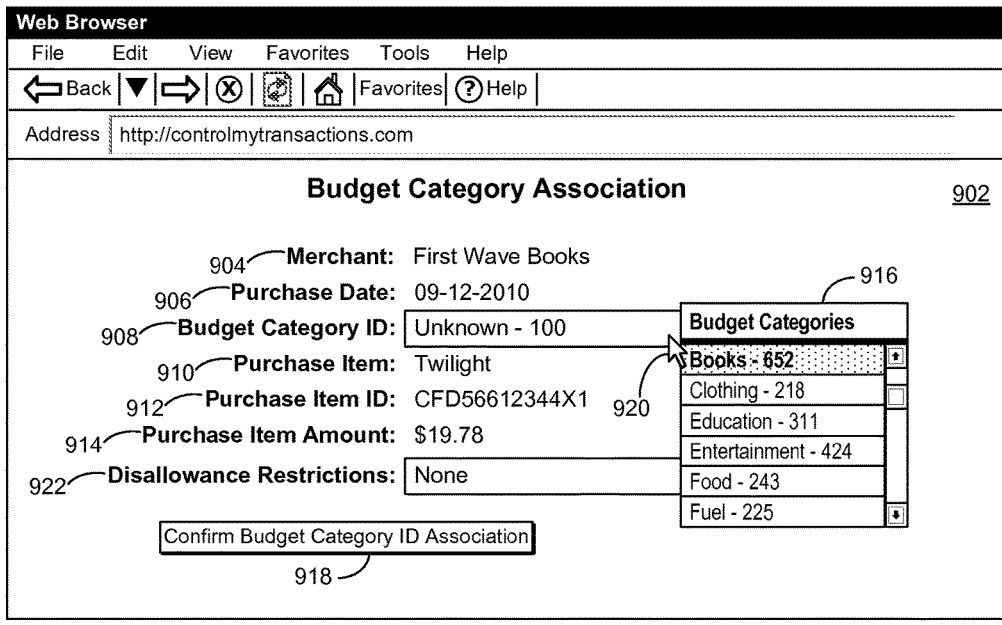
FIG. 9 is a simplified illustration of a transaction control system as implemented within a window of a user interface in accordance with an embodiment of the disclosure for managing the association of purchase item identifiers to budget categories.

FIG. 9 is a simplified illustration of a transaction control system as implemented within a window of a user interface in accordance with an embodiment of the disclosure for the managing the association of purchase item identifiers to budget categories. In this embodiment, a user interface (UI) 246 of a transaction control system comprises a "Budget Category Association" window 902. The "Budget Category Association" window 902 comprises data display fields for 'Merchant' 904, with a value of 'First Wave Books,' 'Purchase Date' 906, with a value of '09-12-2010,' 'Purchase Item' 910, with a value of 'Twilight,' 'Purchase Item ID' 912, with a value of 'CFD56612344XI,' 'Purchase Item Amount' 914, with a value of '$19.78,' and 'Disallowance Restrictions' 922 with a value of 'None,' The "Budget Category Association" window 902 likewise comprises modifiable data display field 'Budget Category ID' 908, with a current value of 'Unknown—100,' and a 'Confirm Budget Category Association' 918 command button. As illustrated in FIG. 9, the user has elected to change the budget category association through the use of a user gesture, such as a right-mouse-click with cursor 920, which results in the display of 'Budget Categories' drop-down menu 616.

Figure 10:
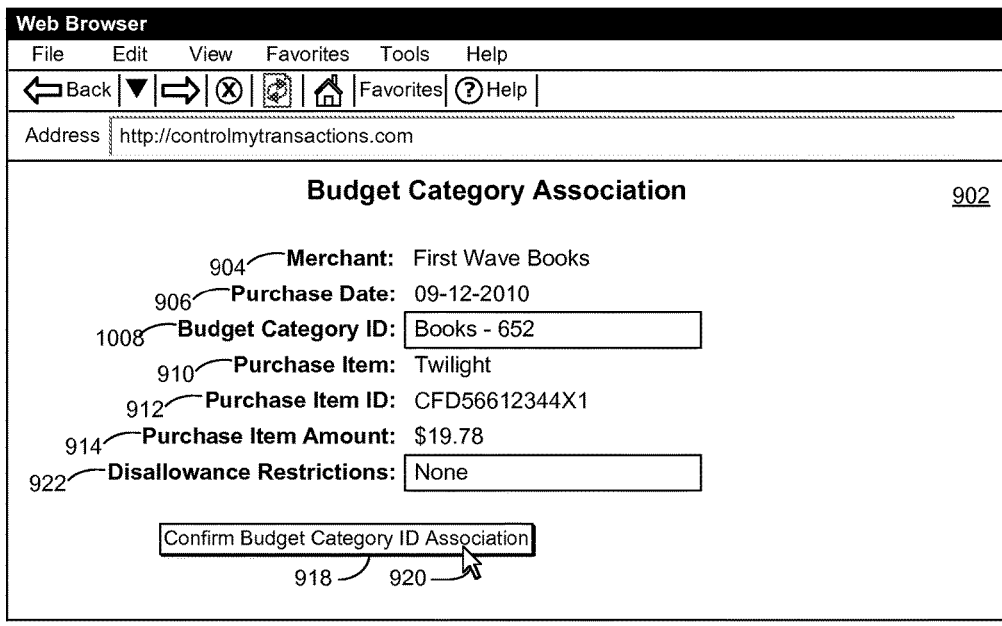
FIG. 10 is a simplified illustration of a budget management system as implemented within a window of a user interface in accordance with an embodiment of the disclosure for modifying the association of a purchase item identifier to a budget category.

FIG. 10 is a simplified illustration of a budget management system as implemented within a window of a user interface in accordance with an embodiment of the disclosure for modifying the association of a purchase item identifier to a budget category. Referring now to FIG. 10, the 'Budget Category ID' 1008 now has a value of 'Books—652' as a result of the budget category association operation illustrated in FIG. 9. Once all budget category association operations are completed, they are confirmed though a user gesture, such as a left-mouse-click with cursor 920 on the 'Confirm Budget Category Association' 918 command button. In various embodiments, the association of 'Purchase Item ID' 912, with a value of 'CFD56612344XI'; and corresponding to 'Merchant' 904 with a value of 'First Wave Books,' to the 'Budget Category ID' 1008 with a value of 'Books—652' results in the generation of a default budget category association. As a result, future instances of 'Purchase Item ID' 912, with a value of 'CFD56612344XI' and 'Merchant' 904 with a value of 'First Wave Books' will be automatically associated with the 'Budget Category ID' 1008 with a value of 'Books—652.' It will be apparent to skilled practitioners of the art that the default budget category association can then be modified thereafter.

Figure 11A:
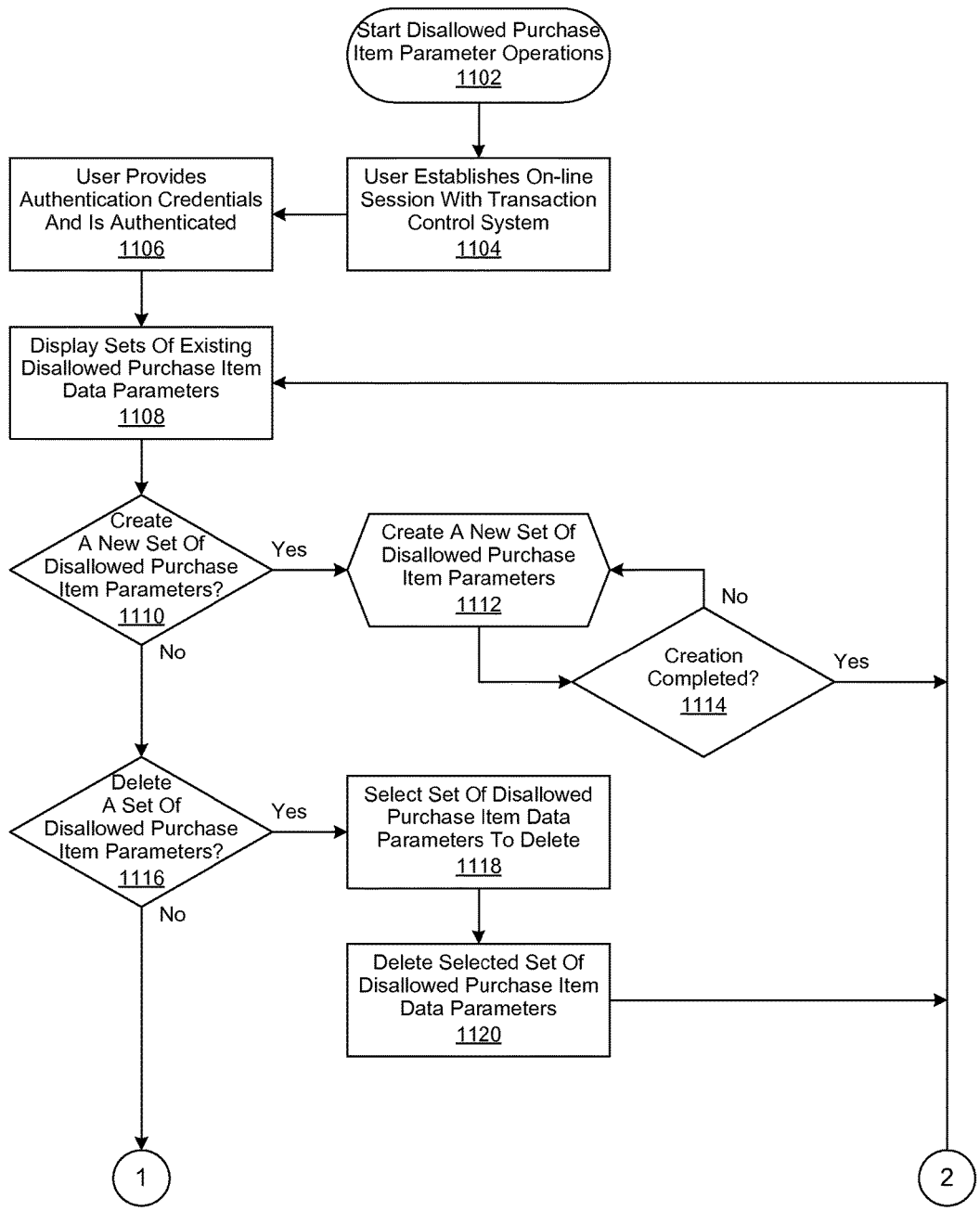
FIGS. 11a-b are a generalized flowchart of the operation of a transaction control system as implemented in an embodiment of the disclosure for the management of disallowed purchase idem data parameters.
Figure 11B:
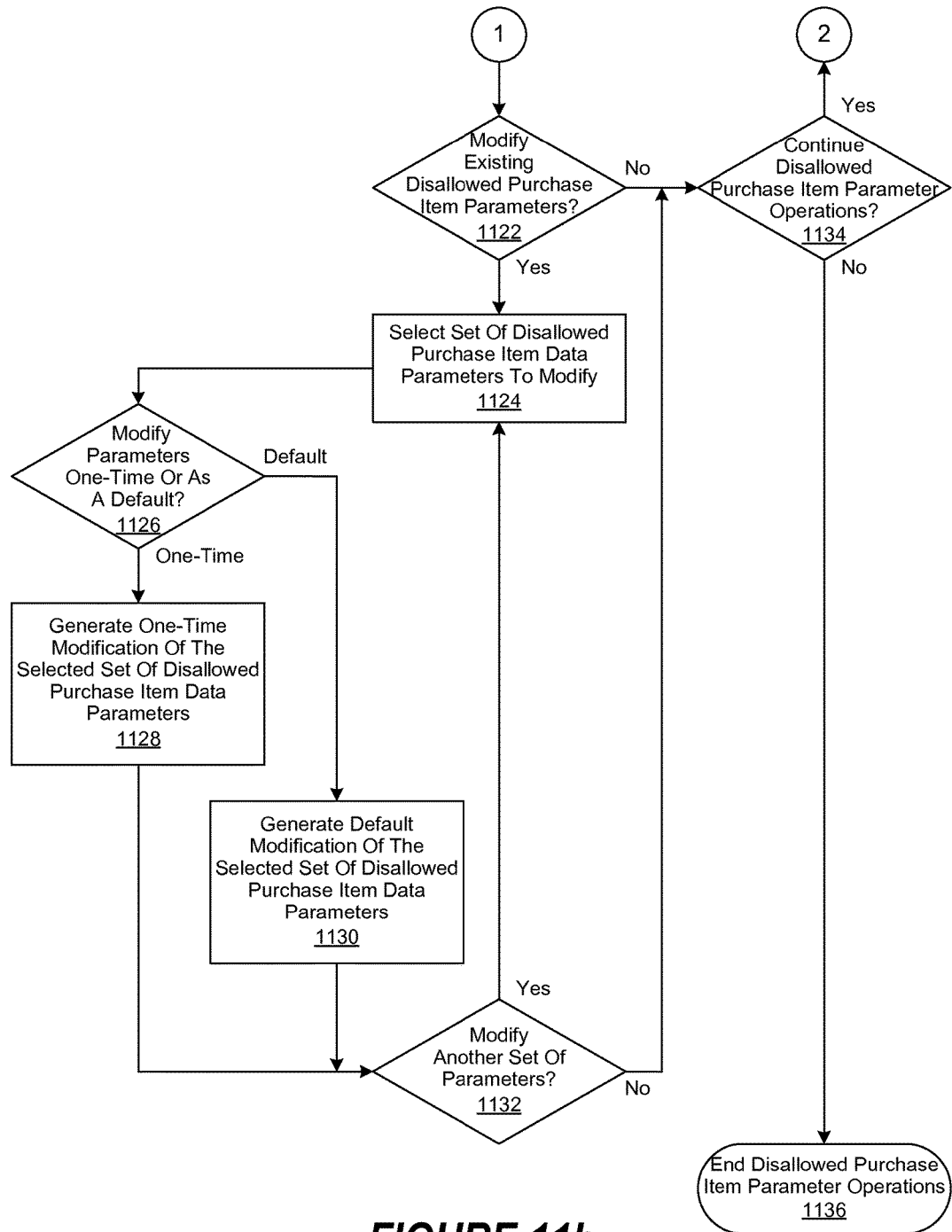

FIGS. 11a-b are a generalized flowchart of the operation of a transaction control system as implemented in an embodiment of the disclosure for the management of disallowed purchase idem data parameters. In this embodiment, disallowed purchase idem data parameter operations are begun in block 1102, followed by followed by a user establishing an on-line session with the transaction control system in block 1104. In block 1106, the user provides authentication credentials and is authenticated, followed by the display in block 1108 of existing sets of disallowed purchase idem data parameters. In various embodiments, the sets of disallowed purchase idem data parameters are displayed within a user interface of the transaction control system implemented on a computing device.

A determination is then made in block 1110 whether to create a new set of disallowed purchase idem data parameters. If so, then they are created in block 1112, followed by a determination in block 114 whether the creation of the new set of disallowed purchase idem data parameters is completed. If not, the process is continued, proceeding with block 1112. Otherwise, the process is continued, proceeding with block 1108. A determination is then made in block 1116 whether to delete an existing set of disallowed purchase idem data parameters. If so, then the target set of disallowed purchase idem data parameters is selected in block 1118 and then deleted in block 1120. The process is then continued, proceeding with block 1108. A determination is then made in block 1122 whether to modify an existing set of disallowed purchase idem data parameters. If not, then a determination is made in block 1134 whether to continue disallowed purchase item data parameter operations. If so, then the process is continued, proceeding with block 1108. Otherwise, disallowed purchase idem data parameter operations are ended in block 1136.

However, if it is determined in block 1122 to modify an existing set of disallowed purchase idem data parameters, then a target set of disallowed purchase idem data parameters is selected in block 1124. A determination is then made in block 1126 whether modifying the disallowed purchase idem data parameters will result in a one-time or default modification. If it is determined in block 1126 that the disallowed purchase idem data parameters are to be modified one time, then a one-time modification is generated in block 1128, otherwise a default modification is generated in block 1130. A determination is then made in block 1132 whether to modify another set of disallowed purchase idem data parameters. If so, then the process is continued, proceeding with block 1124. Otherwise, the process is continued, proceeding with block 1134 as described hereinabove.

Figure 12:
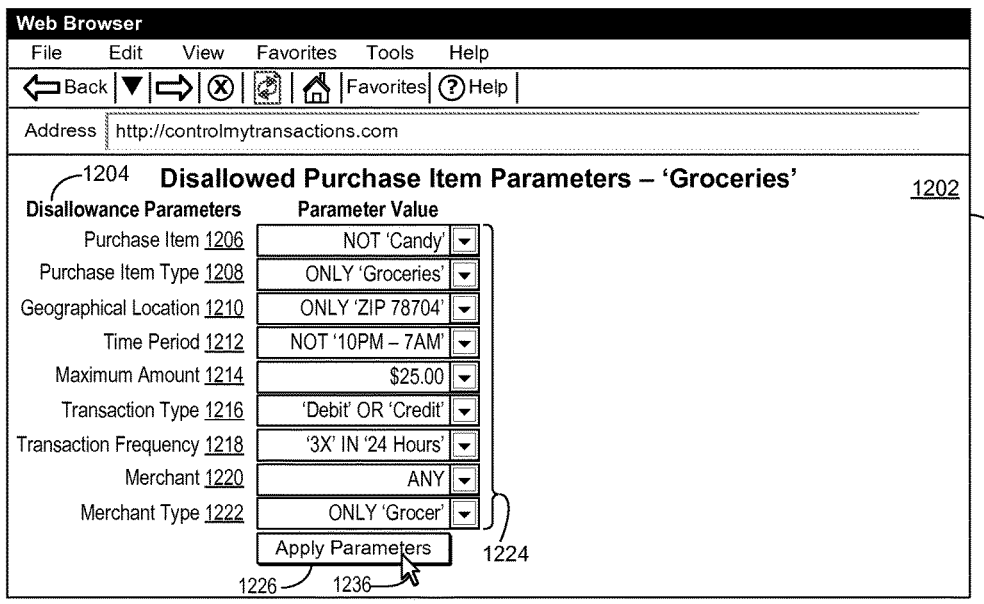
FIG. 12 is a simplified illustration of a transaction control system as implemented within a window of a user interface in accordance with an embodiment of the disclosure for the management of disallowed purchase item data parameters.

FIG. 12 is a simplified illustration of a transaction control system as implemented within a window of a user interface in accordance with an embodiment of the disclosure for the management of disallowed purchase item data parameters. In this embodiment, a user interface (UI) 246 of a transaction control system comprises a 'Disallowed Purchase Item Parameters—Groceries' window 1202. The 'Disallowed Purchase Item Parameters—Groceries' window 1202 comprises 'Disallowance Parameters' 1204 data parameter selection fields. These data parameter selection fields further comprise disallowed purchase item data parameter values 1224 for a 'Purchase Item' 1206, a 'Purchase Item Type' 1208, a 'Geographical Location' 1210, a 'Time Period' 1212, a 'Maximum Amount' 1214, a 'Transaction Type' 1216, a 'Transaction Frequency' 1218, a 'Merchant' 1220, and a 'Merchant Type' 1222.

As illustrated in FIG. 12, the user has selected disallowed purchase item data parameter values 1224 of NOT 'Candy' for 'Purchase Item' 1206, ONLY 'Groceries for 'Purchase Item Type' 1208, ONLY 'ZIP 78704' for 'Geographical Location' 1210, and NOT '10 PM-7 AM' for 'Time Period' 1212. Likewise, the user has selected disallowed purchase item data parameter values 1224 of 'Debit' OR 'Credit' for 'Transaction Type' 1216, '3X' IN '24 Hours' for 'Transaction Frequency' 1218, ANY for 'Merchant' 1220, and ONLY 'Grocer' for 'Merchant Type' 1222.

Once the user has selected the disallowed purchase item data parameter values 1224, they are applied through the use of a user gesture, such as a mouse-click with cursor 1236 on command button 1226 'Apply Parameters'. As a result, the combination of the disallowed purchase item data parameter values 1224 results in an allowed purchase item to be purchased with a transaction control card if the purchase item comprises groceries purchased in Zip code 78704 from any merchant that is a grocer. Furthermore, the maximum amount of the allowed purchase item is $25.00, must be purchased after 7:00 AM and before 10:00 PM as either a credit or debit transaction, and with a transaction frequency not to exceed three times within 24 hours. Otherwise, the purchase item will be disallowed.

Figure 13:
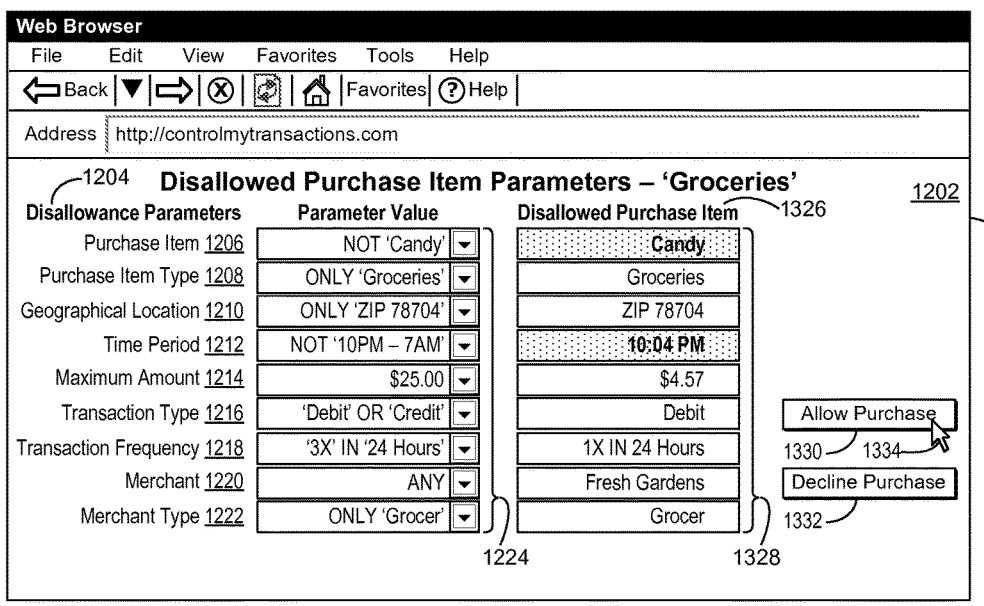
FIG. 13 is a simplified illustration of a transaction control system as implemented within a window of a user interface in accordance with an embodiment of the disclosure for allowing the purchase of disallowed purchase items with a transaction control card.

FIG. 13 is a simplified illustration of a transaction control system as implemented within a window of a user interface in accordance with an embodiment of the disclosure for allowing the purchase of disallowed purchase items with a transaction control card. In this embodiment, a user interface (UI) 246 of a transaction control system comprises a 'Disallowed Purchase Item Parameters—Groceries' window 1202. The 'Disallowed Purchase Item Parameters—Groceries' window 1202 comprises 'Disallowance Parameters' 1204 data parameter selection fields. These data parameter selection fields further comprise disallowed purchase item data parameter values 1224 for a 'Purchase Item' 1206, a 'Purchase Item Type' 1208, a 'Geographical Location' 1210, a 'Time Period' 1212, a 'Maximum Amount' 1214, a 'Transaction Type' 1216, a 'Transaction Frequency' 1218, a 'Merchant' 1220, and a 'Merchant Type' 1222.

As illustrated in FIG. 13, the user has selected disallowed purchase item data parameter values 1224 of NOT 'Candy' for 'Purchase Item' 1206, ONLY 'Groceries' for 'Purchase Item Type' 1208, ONLY 'ZIP 78704' for 'Geographical Location' 1210, and NOT '10 PM-7 AM' for 'Time Period' 1212. Likewise, the user has selected disallowed purchase item data parameter values 1224 of 'Debit' OR 'Credit' for 'Transaction Type' 1216, '3×' IN '24 Hours' for 'Transaction Frequency' 1218, ANY for 'Merchant' 1220, and ONLY 'Grocer' for 'Merchant Type' 1222.

As described in greater detail herein, a user has attempted to purchase a purchase item with a transaction control card. Purchase item data related to the purchase item has been received and processed by the transaction control system to parse individual purchase item data elements 1328, which are then compared to disallowed purchase item data parameter values 1224. As illustrated in FIG. 13, the values of purchase item data elements 1328 comprise 'Candy' for 'Purchase Item' 1206, 'Groceries for 'Purchase Item Type' 1208, 'ZIP 78704' for 'Geographical Location' 1210, and '10:04' for 'Time Period' 1212. Likewise, the values of purchase item data elements 1328 comprise 'Debit' for 'Transaction Type' 1216, '1×' IN '24 Hours' for 'Transaction Frequency' 1218, 'Fresh Gardens' for 'Merchant' 1220, and 'Grocer' for 'Merchant Type' 1222.

As likewise illustrated in FIG. 13, the values of purchase item data elements 1328 'Candy' for 'Purchase Item' 1206 and '10:04' for 'Time Period' 1212 fail to match their corresponding disallowed purchase item data parameter values 1224. As a result, the purchase item is displayed to the user as a disallowed purchase item 1326. The user may elect to either allow or disallow the purchase of the disallowed purchase item through a user gesture, such as a mouse-click with cursor 1332 respectively on command button 1330 'Allow Purchase' or command button 1332 'Decline Purchase.' If the user elects to allow the purchase of the disallowed purchase item 1326, the transaction control system processes the disallowed purchase item 1326 as an allowed purchase item as described in greater detail herein.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A computerized method comprising:
  receiving allowed purchase item data parameters and disallowed purchase item data parameters for purchases made with a card associated with an accountholder;
  processing, by a processor, purchase item data for a transaction request for a transaction made with the card, wherein the purchase item data parameters are stored on the card;
  parsing, by the processor, the purchase item data to generate allowed purchase items and disallowed purchase items;
  determining, by the processor, whether the transaction includes the disallowed purchase items based on the disallowed purchase item data parameters;
  authorizing the allowed purchase items;
  sending, to a mobile device associated with the accountholder, a request for permission for a one-time modification to modify the disallowed purchase item data parameters associated with the disallowed purchase items to allow the disallowed purchase items to be processed as the allowed purchase items;

receiving, from the mobile device of the accountholder, the permission for the one-time modification; and modifying the disallowed purchase item data parameters to allow the disallowed purchase items to be processed as the allowed purchase items.

2. The computerized method of claim 1, wherein the allowed purchase item data parameters and the disallowed purchase item data parameters are based on location.

3. The computerized method of claim 1, further comprising:

determining a location of the transaction; and identifying a terminal of the transaction based on a unique identifier at the terminal of the transaction and the location of the transaction.

4. The computerized method of claim 1, wherein modifying the disallowed purchase item data parameters occurs in real-time.

5. The computerized method of claim 1, wherein the disallowed purchase item data parameters include at least one of: a particular purchase item, a purchase item type, a geographical location, a transaction time period, a maximum amount, a transaction type, a transaction frequency, a particular merchant, or a merchant type.

6. The computerized method of claim 1, further comprising:

processing purchase item amounts corresponding to purchase item identifiers of the allowed purchase items;

associating the purchase item amounts with a budget category identifier to generate a budget category expenditure amount; and generating a budget category variance amount by comparing the budget category expenditure amount with a budget category allowance amount.

7. The computerized method of claim 6, further comprising:

sending the budget category expenditure amount to a device associated with an accountholder of the card; and displaying the budget category expenditure amount on the device associated with the accountholder of the card.

8. A non-transitory computer-readable storage medium including a set of instructions that, when executed by one or more processors, cause a machine to:

receive allowed purchase item data parameters and disallowed purchase item data parameters for purchases made with a card associated with an accountholder;

process purchase item data for a transaction request for a transaction made with the card, wherein the purchase item data parameters are stored on the card;

parse the purchase item data to generate allowed purchase items and disallowed purchase items;

determine whether the transaction includes the disallowed purchase items based on the disallowed purchase item data parameters;

authorize the allowed purchase items;

send, to a mobile device associated with the accountholder, a request for permission for a one-time modification to modify the disallowed purchase item data parameters associated with the disallowed purchase items to allow the disallowed purchase items to be processed as the allowed purchase items;

receive, from the mobile device of the accountholder, the permission for the one-time modification; and modify the disallowed purchase item data parameters to allow the disallowed purchase items to be processed as the allowed purchase items.

9. The non-transitory computer-readable storage medium of claim 8, wherein the allowed purchase item data parameters and the disallowed purchase item data parameters are based on a location of the transaction.

10. The non-transitory computer-readable storage medium of claim 8, wherein the set of instructions, when executed by the one or more processors, further cause the machine to:

determine a location of the transaction based at least in part on a unique identifier at a terminal of the transaction; and identify the terminal of the transaction based at least in part on the unique identifier at the terminal of the transaction.

11. The non-transitory computer-readable storage medium of claim 8, wherein modifying the disallowed purchase item data parameters occurs in real-time.

12. The non-transitory computer-readable storage medium of claim 8, wherein the disallowed purchase item data parameters include at least one of: a particular purchase item, a purchase item type, a geographical location, a transaction time period, a maximum amount, a transaction type, a transaction frequency, a particular merchant, or a merchant type.

13. The non-transitory computer-readable storage medium of claim 8, wherein the set of instructions, when executed by the one or more processors, further cause the machine to:

process purchase item amounts corresponding to purchase item identifiers of the allowed purchase items;

associate the purchase item amounts with a budget category identifier to generate a budget category expenditure amount; and generate a budget category variance amount by comparing the budget category expenditure amount with a budget category allowance amount.

14. The non-transitory computer-readable storage medium of claim 13, wherein the set of instructions, when executed by the one or more processors, further cause the machine to:

send the budget category expenditure amount to a device associated with an accountholder of the card; and display the budget category expenditure amount on the device associated with the accountholder of the card.

15. A transaction control system, comprising:

one or more processors; and a computer-readable storage medium having instructions stored thereon which, when executed by the one or more processors, cause the transaction control system to:

receive allowed purchase item data parameters and disallowed purchase item data parameters for purchases made with a card associated with an accountholder;

process purchase item data for a transaction request for a transaction made with the card, wherein the purchase item data parameters are stored on the card;

parse the purchase item data to generate allowed purchase items and disallowed purchase items;

determine whether the transaction includes the disallowed purchase items based on the disallowed purchase item data parameters;

authorize the allowed purchase items;

send, to a mobile device associated with the accountholder, a request for permission for a one-time modification to modify the disallowed purchase item data parameters associated with the disallowed purchase items to allow the disallowed purchase items to be processed as the allowed purchase items;

receive, from the mobile device of the accountholder, the permission for the one-time modification; and modify the disallowed purchase item data parameters to allow the disallowed purchase items to be processed as the allowed purchase items.

16. The transaction control system of claim 15, wherein the allowed purchase item data parameters and the disallowed purchase item data parameters are based on a location of the transaction.

17. The transaction control system of claim 15, wherein the instructions, when executed by the one or more processors, further cause the transaction control system to:

determine a location of the transaction based at least in part on a unique identifier at a terminal of the transaction; and identify the terminal of the transaction based at least in part on the unique identifier at the terminal of the transaction.

18. The transaction control system of claim 15, wherein modifying the disallowed purchase item data parameters occurs in real-time.

19. The transaction control system of claim 15, wherein the instructions, when executed by the one or more processors, further cause the transaction control system to:

process purchase item amounts corresponding to purchase item identifiers of the allowed purchase items;

associate the purchase item amounts with a budget category identifier to generate a budget category expenditure amount; and generate a budget category variance amount by comparing the budget category expenditure amount with a budget category allowance amount.

20. The transaction control system of claim 19, wherein the instructions, when executed by the one or more processors, further cause the transaction control system to:

send the budget category expenditure amount to a device associated with an accountholder of the card; and display the budget category expenditure amount on the device associated with the accountholder of the card.

* * * * *